United States Patent
Trenchard et al.

(10) Patent No.: US 10,761,496 B2
(45) Date of Patent: Sep. 1, 2020

(54) APPARATUS AND METHOD FOR IDENTIFYING IMPACTS AND CAUSES OF VARIABILITY OR CONTROL GIVEAWAY ON MODEL-BASED CONTROLLER PERFORMANCE

(71) Applicant: Honeywell International Inc., Morris Plains, NJ (US)

(72) Inventors: Andrew John Trenchard, Romsey (GB); Sanjay K. Dave, Bangalore (IN); Christopher J. Webb, Scottsdale, AZ (US); Michael Niemiec, Dexter, MI (US); Mandar Vartak, Bangalore (IN); Sriram Hallihole, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 89 days.

(21) Appl. No.: 15/973,272

(22) Filed: May 7, 2018

(65) Prior Publication Data
US 2018/0356773 A1 Dec. 13, 2018

Related U.S. Application Data

(60) Provisional application No. 62/518,478, filed on Jun. 12, 2017, provisional application No. 62/518,397, (Continued)

(51) Int. Cl.
G05B 19/4063 (2006.01)
G05B 13/04 (2006.01)
(Continued)

(52) U.S. Cl.
CPC ......... *G05B 13/041* (2013.01); *G05B 19/406* (2013.01); *G05B 19/4063* (2013.01);
(Continued)

(58) Field of Classification Search
None
See application file for complete search history.

(56) References Cited

U.S. PATENT DOCUMENTS 5,351,184 A 9/1994 Lu et al.
5,602,761 A 2/1997 Spoerre et al.
(Continued)

FOREIGN PATENT DOCUMENTS

WO 0020939 A1 4/2000
WO 2004070569 A2 8/2004
(Continued)

OTHER PUBLICATIONS

International Search Report and Written Opinion of the International Searching Authority regarding International Patent Application No. PCT/US2016/031595 dated Aug. 18, 2016, 15 pages.
(Continued)

*Primary Examiner* — Kenneth M Lo
*Assistant Examiner* — Istiaque Ahmed
(74) *Attorney, Agent, or Firm* — Seager, Tufte & Wickhem, LLP

(57) ABSTRACT

A method includes obtaining data identifying values of one or more controlled variables associated with an industrial process controller. The method also includes identifying periods when at least one of the one or more controlled variables has been moved to an associated limit by the controller. The method further includes, for each identified period, (i) identifying a standard deviation of predicted values for the associated controlled variable and (ii) determining a control giveaway value for the associated controlled variable based on the standard deviation. The control giveaway value is associated with an offset between the associated controlled variable's average value and the associated limit. In addition, the method includes identifying
(Continued)

variances in the one or more controlled variables using the control giveaway values and generating a graphical display identifying one or more impacts or causes for at least some of the variances.

20 Claims, 16 Drawing Sheets

Related U.S. Application Data filed on Jun. 12, 2017, provisional application No. 62/518,474, filed on Jun. 12, 2017, provisional application No. 62/518,352, filed on Jun. 12, 2017.

(51) Int. Cl.
*G05B 19/406* (2006.01)
*G05B 19/418* (2006.01)
*G05B 23/02* (2006.01)

(52) U.S. Cl.
CPC ... *G05B 19/41885* (2013.01); *G05B 23/0272* (2013.01); *G05B 2219/23292* (2013.01); *G05B 2219/31359* (2013.01); *G05B 2219/37001* (2013.01)

(56) References Cited

U.S. PATENT DOCUMENTS

| | | | |
|---|---|---|---|
| 5,715,178 A * | 2/1998 | Scarola | G05B 9/03 702/116 |
| 6,577,323 B1 | 6/2003 | Jamieson et al. | |
| 6,666,049 B1 | 12/2003 | Katende et al. | |
| 6,901,560 B1 | 5/2005 | Guerlain et al. | |
| 7,421,374 B2 | 9/2008 | Zhan et al. | |
| 8,108,790 B2 | 1/2012 | Morrison, Jr. et al. | |
| 8,185,217 B2 | 5/2012 | Thiele | |
| 9,715,221 B2 | 7/2017 | Zheng et al. | |
| 2004/0049299 A1 | 3/2004 | Wojsznis et al. | |
| 2005/0075738 A1 | 4/2005 | Attarwala | |
| 2005/0137721 A1 | 6/2005 | Attarwala | |
| 2005/0149208 A1 | 7/2005 | Harmse et al. | |
| 2005/0171626 A1 | 8/2005 | Schwarm | |
| 2007/0225835 A1 | 9/2007 | Zhu | |
| 2007/0268122 A1 | 11/2007 | Kow et al. | |
| 2007/0276512 A1 | 11/2007 | Fan et al. | |
| 2008/0065242 A1 | 3/2008 | Attarwala | |
| 2008/0140227 A1 | 6/2008 | Attarwala | |
| 2008/0243289 A1 | 10/2008 | Yelchuru et al. | |
| 2008/0244449 A1 | 10/2008 | Morrison et al. | |
| 2009/0043546 A1 | 2/2009 | Srinivasan et al. | |
| 2009/0204245 A1 | 8/2009 | Sustaeta et al. | |
| 2009/0287319 A1 | 11/2009 | Attarwala | |
| 2009/0319059 A1 | 12/2009 | Renfro et al. | |
| 2010/0082396 A1 | 4/2010 | Caldwell et al. | |
| 2010/0156654 A1 | 6/2010 | Bullemer et al. | |
| 2010/0241247 A1 | 9/2010 | Attarwala | |
| 2010/0318934 A1 * | 12/2010 | Blevins | G05B 13/048 715/772 |
| 2011/0130850 A1 | 6/2011 | Zheng et al. | |
| 2011/0258568 A1 | 10/2011 | Pandurangan et al. | |
| 2013/0317629 A1 | 11/2013 | Shapiro et al. | |
| 2014/0330402 A1 | 11/2014 | Keenan et al. | |
| 2014/0344007 A1 | 11/2014 | Shende et al. | |
| 2015/0134647 A1 | 5/2015 | Sayyarrodsari et al. | |
| 2015/0371418 A1 | 12/2015 | Laycock et al. | |
| 2016/0171414 A1 * | 6/2016 | Lee | G06O 10/06393 705/7.39 |
| 2016/0234242 A1 | 8/2016 | Knapp et al. | |
| 2016/0349740 A1 | 12/2016 | Niemiec et al. | |
| 2017/0357240 A1 | 12/2017 | Stewart et al. | |
| 2018/0032940 A1 | 2/2018 | Trenchard et al. | |

FOREIGN PATENT DOCUMENTS

| | | | |
|---|---|---|---|
| WO | 2007067645 A2 | 6/2007 |
| WO | 2009120362 A2 | 10/2009 |
| WO | 2013087973 A1 | 6/2013 |

OTHER PUBLICATIONS

Martin et al., "Estimating control function benefits," Hydrocarbon Processing 69, 1991, pp. 68-73.

Webb et al., "Using Advanced Control to Monitor Unit Performance and Economics," American Institute of Chemical Engineers, 2018 Spring Meeting and 14th Global Congress on Process Safety, Apr. 2018, 21 pages.

Dave et al., "Apparatus and Method for Estimating Impacts of Operational Problems in Advanced Control Operations for Industrial Control Systems", U.S. Appl. No. 15/972,534, filed May 7, 2018, 46 pages.

Vartak et al., "Apparatus and Method for Identifying, Visualizing, and Triggering Workflows From Auto-Suggested Actions to Reclaim Lost Benefits of Model-Based Industrial Process Controllers", U.S. Appl. No. 15/972,535, filed May 7, 2018, 37 pages.

Trenchard et al., "Apparatus and Method for Automated Identification and Diagnosis of Constraint Violations", U.S. Appl. No. 15/972,432, filed May 7, 2018, 55 pages.

* cited by examiner

APPARATUS AND METHOD FOR IDENTIFYING IMPACTS AND CAUSES OF VARIABILITY OR CONTROL GIVEAWAY ON MODEL-BASED CONTROLLER PERFORMANCE

CROSS-REFERENCE TO RELATED APPLICATIONS AND PRIORITY CLAIM

This application claims priority under 35 U.S.C. § 119(e) to the following U.S. provisional patent applications:

U.S. Provisional Patent Application No. 62/518,352 filed on Jun. 12, 2017;

U.S. Provisional Patent Application No. 62/518,397 filed on Jun. 12, 2017;

U.S. Provisional Patent Application No. 62/518,474 filed on Jun. 12, 2017; and

U.S. Provisional Patent Application No. 62/518,478 filed on Jun. 12, 2017.

All of these provisional applications are hereby incorporated by reference in their entirety.

TECHNICAL FIELD

This disclosure relates generally to industrial process control and automation systems. More specifically, this disclosure relates to an apparatus and method for identifying impacts and causes of variability or control giveaway on model-based controller performance.

BACKGROUND

Industrial process control and automation systems are often used to automate large and complex industrial processes. These types of control and automation systems routinely include process controllers and field devices like sensors and actuators. Some of the process controllers typically receive measurements from the sensors and generate control signals for the actuators.

Model-based industrial process controllers are one type of process controller routinely used to control the operations of industrial processes. Model-based process controllers typically use one or more models to mathematically represent how one or more properties within an industrial process respond to changes made to the industrial process. Unfortunately, the benefits that can be obtained using model-based controllers often decline over time. This can be due to a number of factors, such as inaccurate models, misconfiguration, or operator actions. In some extreme cases, the benefits that could be obtained using model-based controllers can be reduced by up to fifty percent or even more over time.

SUMMARY

This disclosure provides an apparatus and method for identifying impacts and causes of variability or control giveaway on model-based controller performance.

In a first embodiment, a method includes obtaining data identifying values of one or more controlled variables associated with an industrial process controller. The method also includes identifying periods when at least one of the one or more controlled variables has been moved to an associated limit by the controller. The method further includes, for each identified period, (i) identifying a standard deviation of predicted values for the associated controlled variable and (ii) determining a control giveaway value for the associated controlled variable based on the standard deviation. The control giveaway value is associated with an offset between the associated controlled variable's average value and the associated limit. In addition, the method includes identifying variances in the one or more controlled variables using the control giveaway values and generating a graphical display identifying one or more impacts or causes for at least some of the variances.

In a second embodiment, an apparatus includes at least one interface configured to receive data identifying values of one or more controlled variables associated with an industrial process controller. The apparatus also includes at least one processor configured to identify periods when at least one of the one or more controlled variables has been moved to an associated limit by the controller. The at least one processor is also configured, for each identified period, to (i) identify a standard deviation of predicted values for the associated controlled variable and (ii) determine a control giveaway value for the associated controlled variable based on the standard deviation. The control giveaway value is associated with an offset between the associated controlled variable's average value and the associated limit. The at least one processor is further configured to identify variances in the one or more controlled variables using the control giveaway values and generate a graphical display identifying one or more impacts or causes for at least some of the variances.

In a third embodiment, a non-transitory computer readable medium contains instructions that when executed cause at least one processing device to obtain data identifying values of one or more controlled variables associated with an industrial process controller. The medium also contains instructions that when executed cause the at least one processing device to identify periods when at least one of the one or more controlled variables has been moved to an associated limit by the controller. The medium further contains instructions that when executed cause the at least one processing device, for each identified period, to (i) identify a standard deviation of predicted values for the associated controlled variable and (ii) determine a control giveaway value for the associated controlled variable based on the standard deviation. The control giveaway value is associated with an offset between the associated controlled variable's average value and the associated limit. In addition, the medium contains instructions that when executed cause the at least one processing device to identify variances in the one or more controlled variables using the control giveaway values and generate a graphical display identifying one or more impacts or causes for at least some of the variances.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
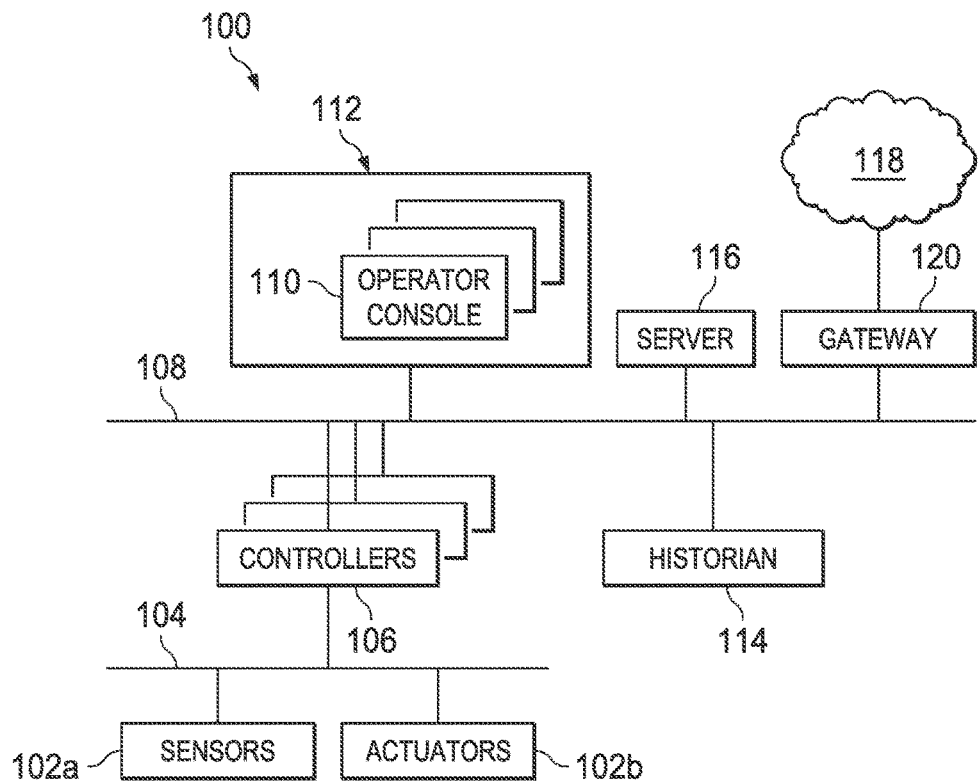
FIG. 1 illustrates an example industrial process control and automation system according to this disclosure.

FIGS. 1 through 13, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

As noted above, model-based industrial process controllers are one type of process controller routinely used to control the operations of industrial processes. Model-based process controllers can help to improve the performance of continuous or other industrial processes. For example, in industrial processes, a controlled variable (CV) generally represents a process variable that can be measured or inferred and that is ideally controlled to be at or near a desired setpoint or within a desired range of values. A manipulated variable (MV) generally represents a process variable that can be adjusted in order to alter one or more controlled variables. A disturbance variable (DV) generally represents a process variable whose value can be considered but cannot be controlled. As a simple example, a flow rate of material through a pipe could denote a controlled variable, a valve opening for a valve that controls the flow rate of material could denote a manipulated variable, and an ambient temperature around the pipe or the valve could denote a disturbance variable.

Model-based controllers can help to reduce the variability of key process variables (controlled variables) and optimize these key variables through changes to other process variables (manipulated variables). Model-based controllers often attempt to optimize the values of their controlled variables through changes to their manipulated variables in order to push the controlled variables to the most attractive set of constraints. The most attractive set of constraints could represent the most economically-attractive set of constraints, such as the set of constraints that minimizes material usage, minimizes energy usage, or maximizes production.

The variability of controlled variables (such as the variability characterized by the standard deviation of a controlled variable's value) often has a direct impact on how close a model-based controller can operate to its constraints. While an optimization objective function within a model-based controller often aims to move a set of controlled variables towards their constraint limits, a control function within the same controller often aims to reduce the amount or percentage of time that the controlled variables are violating their high or low limits. If the controlled variables have no variation (their standard deviation is zero), these two objectives can be met simultaneously. However, as the standard deviations of the controlled variables increase, there is tension between the control and optimization objectives, causing the average values of the controlled variables to move away from their optimized high or low limits.

The distance or difference between the actual or average operating point of a model-based controller and its associated constraint or control limit can be referred to as "control giveaway." Larger control giveaway values indicate that a model-based controller is operating farther away from its constraints, which may be generally undesirable. Process variability and control giveaway can result from a number of factors and can vary over time. As a result, the benefits that can be obtained using model-based controllers can also vary over time and typically decrease as time goes on. Thus, it may be necessary or desirable to identify process variability or control giveaway associated with a model-based controller and to make changes in order to reduce or minimize the process variability or control giveaway. This can have a direct impact on how well an industrial process is controlled using the model-based controller.

This disclosure provides various techniques for evaluating process variability or control giveaway much more frequently in order to provide an early detection of loss of performance in a model-based controller. Visualizations can be provided to help users identify potential causes of the process variability or control giveaway, which can help to improve the speed of resolving the process variability or control giveaway issues. The visualizations can also be provided to help the users identify the impacts of the process variability or control giveaway (such as in economic terms), which can help the users to see the benefits of resolving the process variability or control giveaway issues.

In this way, these techniques help to identify the actual causes and impacts of process variability and control giveaway on a model-based controller's ability to drive closer to its constraints, without assumptions regarding data distributions or controller tunings. The results of the analyses can then be used to modify the operation of the model-based controller or other components in order to reduce the process variability or control giveaway of the controller, which affects how the controller controls the underlying industrial process.

Among other things, this could enable a new Industrial Internet of Things (IIoT) service or other service to be deployed, where the service can be used to reduce the cost of troubleshooting a model-based controller's performance and to improve the lifecycle benefits of the model-based controller. In particular embodiments, these techniques could be implemented using a computer program that periodically analyses batches of data collected from customers' premises as part of a cloud-based analytics solution. The resulting analysis conclusions could then be visualized to the customers using cloud-hosted dashboards to enable the customers, support engineering teams, or other personnel to view performance information and troubleshoot performance issues.

FIG. 1 illustrates an example industrial process control and automation system 100 according to this disclosure. As shown in FIG. 1, the system 100 includes various components that facilitate production or processing of at least one product or other material. For instance, the system 100 can be used to facilitate control over components in one or multiple industrial plants. Each plant represents one or more processing facilities (or one or more portions thereof), such as one or more manufacturing facilities for producing at least one product or other material. In general, each plant may implement one or more industrial processes and can individually or collectively be referred to as a process system. A process system generally represents any system or portion thereof configured to process one or more products or other materials in some manner.

In FIG. 1, the system 100 includes one or more sensors 102a and one or more actuators 102b. The sensors 102a and actuators 102b represent components in a process system that may perform any of a wide variety of functions. For example, the sensors 102a could measure a wide variety of characteristics in the process system, such as flow, pressure, or temperature. Also, the actuators 102b could alter a wide variety of characteristics in the process system, such as valve openings. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent at least one Ethernet network (such as one supporting a FOUNDATION FIELDBUS protocol), electrical signal network (such as a HART network), pneumatic control signal network, or any other or additional type(s) of network(s).

The system 100 also includes various controllers 106. The controllers 106 can be used in the system 100 to perform various functions in order to control one or more industrial processes. For example, a first set of controllers 106 may use measurements from one or more sensors 102a to control the operation of one or more actuators 102b. A second set of controllers 106 could be used to optimize the control logic or other operations performed by the first set of controllers. A third set of controllers 106 could be used to perform additional functions. The controllers 106 could therefore support a combination of approaches, such as regulatory control, advanced regulatory control, supervisory control, and advanced process control.

Each controller 106 includes any suitable structure for controlling one or more aspects of an industrial process. At least some of the controllers 106 could, for example, represent proportional-integral-derivative (PID) controllers or multivariable controllers, such as controllers implementing model predictive control (MPC) or other advanced process control (APC). As a particular example, each controller 106 could represent a computing device running a real-time operating system, a WINDOWS operating system, or other operating system.

At least one of the controllers 106 shown in FIG. 1 denotes a model-based controller that operates using one or more process models. For example, each of these controllers 106 could operate using one or more process models to determine, based on measurements from one or more sensors 102a, how to adjust one or more actuators 102b. In some embodiments, each model associates one or more manipulated or disturbance variables (often referred to as independent variables) with one or more controlled variables (often referred to as dependent variables). Each of these controllers 106 could use an objective function to identify how to adjust its manipulated variables in order to push its controlled variables to the most attractive set of constraints.

At least one network 108 couples the controllers 106 and other devices in the system 100. The network 108 facilitates the transport of information between components. The network 108 could represent any suitable network or combination of networks. As particular examples, the network 108 could represent at least one Ethernet network.

Operator access to and interaction with the controllers 106 and other components of the system 100 can occur via various operator consoles 110. Each operator console 110 could be used to provide information to an operator and receive information from an operator. For example, each operator console 110 could provide information identifying a current state of an industrial process to the operator, such as values of various process variables and warnings, alarms, or other states associated with the industrial process. Each operator console 110 could also receive information affecting how the industrial process is controlled, such as by receiving setpoints or control modes for process variables controlled by the controllers 106 or other information that alters or affects how the controllers 106 control the industrial process. Each operator console 110 includes any suitable structure for displaying information to and interacting with an operator. For example, each operator console 110 could represent a computing device running a WINDOWS operating system or other operating system.

Multiple operator consoles 110 can be grouped together and used in one or more control rooms 112. Each control room 112 could include any number of operator consoles 110 in any suitable arrangement. In some embodiments, multiple control rooms 112 can be used to control an industrial plant, such as when each control room 112 contains operator consoles 110 used to manage a discrete part of the industrial plant.

The control and automation system 100 here may optionally include at least one historian 114 and/or one or more servers 116. The historian 114 represents a component that stores various information about the system 100. The historian 114 could, for instance, store information that is generated by the various controllers 106 during the control of one or more industrial processes. The historian 114 includes any suitable structure for storing and facilitating retrieval of information. Although shown as a single component here, the historian 114 could be located elsewhere in the system 100, or multiple historians could be distributed in different locations in the system 100.

Each server 116 denotes a computing device that executes applications for users of the operator consoles 110 or other applications. The applications could be used to support various functions for the operator consoles 110, the controllers 106, or other components of the system 100. Each server 116 could represent a computing device running a WINDOWS operating system or other operating system. Note that while shown as being local within the control and automation system 100, the functionality of the server 116 could be remote from the control and automation system 100. For instance, the functionality of the server 116 could be implemented in a computing cloud 118 or a remote server communicatively coupled to the control and automation system 100 via a gateway 120.

At least one component of the system 100 could support a mechanism for identifying impacts and causes of variability or control giveaway on model-based controller performance. For example, this functionality could be implemented in an operator console 110, a server 116, or a computing cloud 118 or remote server. Among other things, this functionality can be used to evaluate process variability or control giveaway much more frequently in order to provide an early detection of the loss of performance in one or more model-based controllers 106. Visualizations can also be provided, such as on displays of the operator consoles 110, to help users identify potential causes or impacts of the process variability or control giveaway. Ideally, this allows the process variability or control giveaway to be identified and reduced, which can help to improve the operation of the model-based controllers 106. Additional details regarding this functionality are provided below.

Although FIG. 1 illustrates one example of an industrial process control and automation system 100, various changes may be made to FIG. 1. For example, the system 100 could include any number of sensors, actuators, controllers, networks, operator consoles, control rooms, historians, servers, and other components. Also, the makeup and arrangement of the system 100 in FIG. 1 is for illustration only. Components could be added, omitted, combined, further subdivided, or placed in any other suitable configuration according to particular needs. As a particular example, the historian 114 may be implemented in the computing cloud 118. Further, particular functions have been described as being performed by particular components of the system 100. This is for illustration only. In general, control and automation systems are highly configurable and can be configured in any suitable manner according to particular needs. In addition, FIG. 1 illustrates one example operational environment where impacts and causes of variability or control giveaway on model-based controller performance can be identified. This functionality can be used in any other suitable system.

Figure 2:
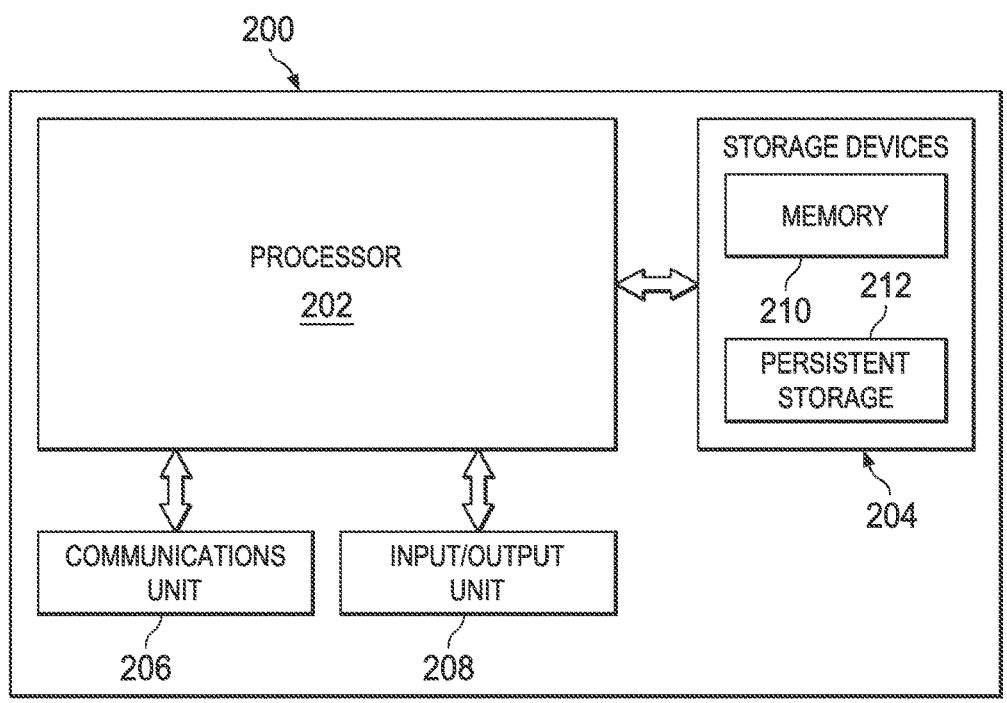
FIG. 2 illustrates an example device for identifying impacts and causes of variability or control giveaway on model-based controller performance according to this disclosure.

FIG. 2 illustrates an example device 200 for identifying impacts and causes of variability or control giveaway on model-based controller performance according to this disclosure. The device 200 could, for example, denote an operator console 110, server 116, or device used in the computing cloud 118 described above with respect to FIG. 1. However, the device 200 could be used in any other suitable system.

As shown in FIG. 2, the device 200 includes at least one processor 202, at least one storage device 204, at least one communications unit 206, and at least one input/output (I/O) unit 208. Each processor 202 can execute instructions, such as those that may be loaded into a memory 210. The instructions could identify impacts and causes of variability or control giveaway on model-based controller performance as described in this patent document. Each processor 202 denotes any suitable processing device, such as one or more microprocessors, microcontrollers, digital signal processors, application specific integrated circuits (ASICs), field programmable gate arrays (FPGAs), or discrete circuitry.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc.

The communications unit 206 supports communications with other systems or devices. For example, the communications unit 206 could include a network interface card or a wireless transceiver facilitating communications over a wired or wireless network. The communications unit 206 may support communications through any suitable physical or wireless communication link(s).

The I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device.

Although FIG. 2 illustrates one example of a device 200 for identifying impacts and causes of variability or control giveaway on model-based controller performance, various changes may be made to FIG. 2. For example, components could be added, omitted, combined, further subdivided, or placed in any other suitable configuration according to particular needs. Also, computing devices can come in a wide variety of configurations, and FIG. 2 does not limit this disclosure to any particular configuration of computing device.

Figure 3:
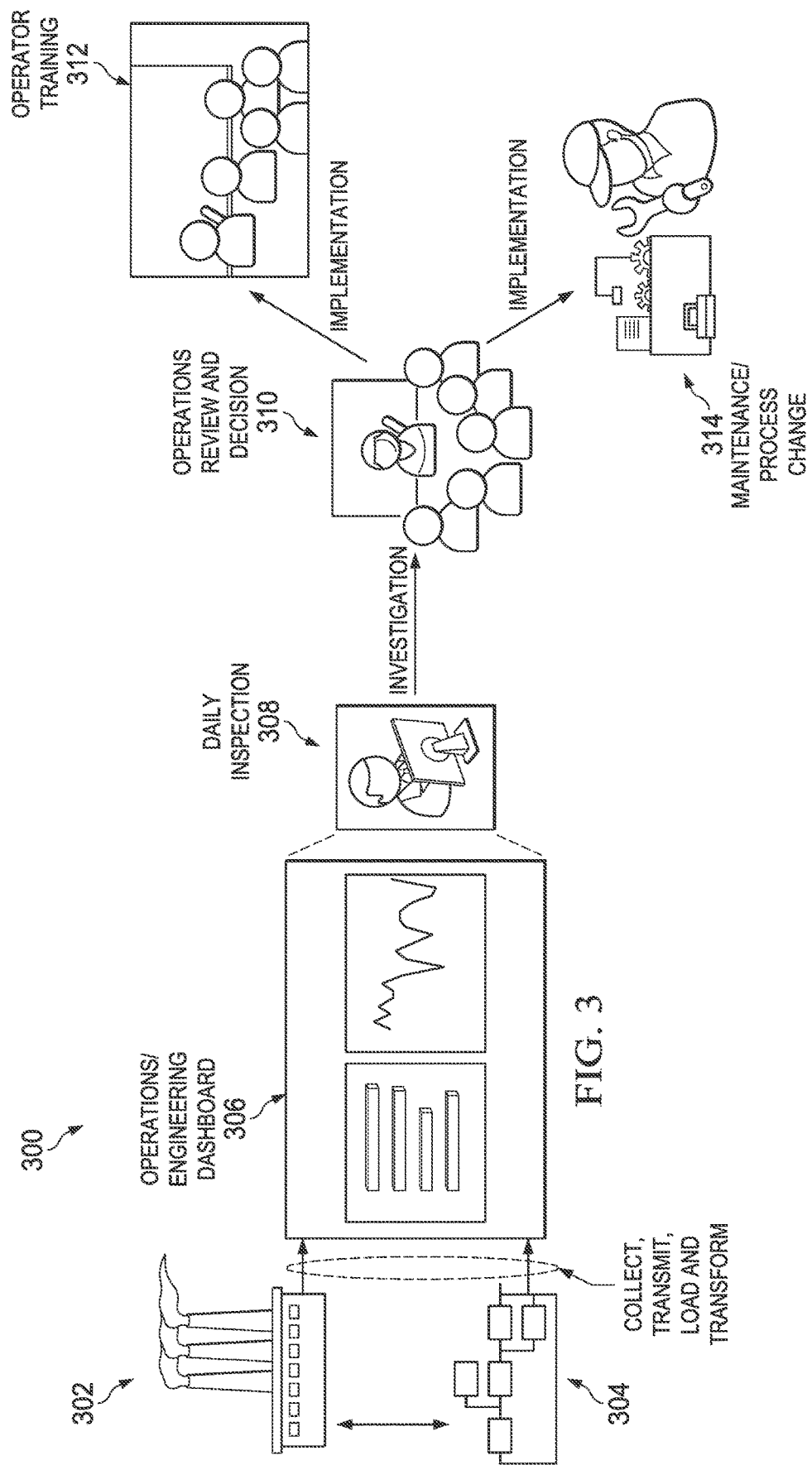
FIG. 3 illustrates an example process for identifying and using impacts and causes of variability or control giveaway on model-based controller performance according to this disclosure.

FIG. 3 illustrates an example process 300 for identifying and using impacts and causes of variability or control giveaway on model-based controller performance according to this disclosure. As shown in FIG. 3, data associated with at least one industrial process 302 and data associated with at least one industrial process control and automation system 304 (which could represent the system 100) can be collected. The data associated with the industrial process 302 could represent any suitable data, such as the values of various controlled, manipulated, and optionally disturbance variables. The data associated with the control and automation system 304 could also represent any suitable data, such as an identification of process variable constraints or other data used, generated, or collected by the system 304.

The data could be collected by any suitable device or system, such as an operator console 110, server 116, or device used in the computing cloud 118 described above with respect to FIG. 1. Also, while shown as being collected from the industrial process 302 and the system 304, the data could be obtained from any suitable source(s). For instance, the system 304 could collect data about the industrial process 302 and provide all of the data for analysis, or the data about the industrial process 302 and the system 304 could be stored in at least one historian or other database and retrieved for analysis. Note that a secure data transfer mechanism could be used to protect the data being collected and transmitted, and the data could be collected and transmitted in real-time, near real-time, or non-real-time depending on the implementation.

However the data is obtained, the data can be stored and analyzed periodically, continuously, or at other times in order to determine key process variable metrics and controller performance metrics. For example, the data can be analyzed as described below in order to identify process variability or control giveaway associated with one or more model-based controllers, such as one or more controllers 106 operating in the system 304. The data can also be analyzed to identify impacts and causes of the process variability or control giveaway.

In some embodiments, the results of the analysis can identify any key process variable constraint violations associated with a model-based controller 106, such as those associated with equipment operating boundaries, qualities, or environmental constraints and their causes. The results can also identify the overall contribution of the model-based controller 106 to some characteristic, such as the overall economic contribution of the controller (which could be expressed in terms of economics, material or energy usage, production, etc.). The results can further identify the issues limiting the performance of the model-based controller 106 and the relative impact of each issue. Example issues that could limit performance of the controller 106 may include an incorrect setting of one or more controller limits by an operator, instrumentation issues (such as sensor or valve issues), and increased process variance due to external disturbances, equipment issues, or control system tunings.

In some embodiments, the analysis of the collected data involves the use of a "digital twin" associated with a model-based controller's optimizer. In other words, a replica of the functionality of the controller's optimizer can be used during the analysis, such as to perform "what if" analyses to determine how the controller could have operated differently. This allows the analysis to determine whether operation of the controller could be improved to push the controller closer to its constraints. This also allows the analysis to determine the impacts (such as in terms of economics, material usage, energy usage, production, etc.) that process variability or control giveaway of the controller could have on an overall industrial process.

The results of the analysis can be used to generate one or more dashboards 306. The dashboards 306 can be viewed by one or more users to, among other things, identify process variability or control giveaway of a model-based controller 106 and identify impacts and potential causes of the process variability or control giveaway. For example, the dashboards 306 could be used during daily inspections 308 to identify whether an investigation is needed into the impacts and potential causes of process variability or control giveaway. If so, review and decision personnel 310 could use the dashboards 306 to more closely investigate what might be causing the process variability or control giveaway. Once likely causes are identified, corrective action could be taken, such as scheduling operator training 312 or implementing changes 314 in the industrial process 302 or control and automation system 304. Of course, the dashboards 306 or the results of the analyses could be used in any other suitable manner.

In some embodiments, the analysis results can be presented in different dashboards 306 based on the roles of the users using the dashboards 306. For example, an operations management view in a dashboard 306 could allow an operations manager to understand the impacts of operator behaviors, equipment issues, and other external factors on a model-based controller 106 and consequently the impacts of those factors on performance of the industrial process 302 and the health of equipment in the industrial process 302. A process engineer's view in a dashboard 306 could highlight the impacts of key constraint limits on the performance of the industrial process 302. A control engineer's view in a dashboard 306 could provide detailed diagnostic insights into underlying causes of good or poor controller performance, possibly along with an assessment of the economic or other impacts of the underlying issues to help justify corrective actions (such as process or application maintenance or operator training).

One example goal here could be to provide a good line of sight between the issues that impact a model-based controller's performance and lost opportunity costs associated with those impacts. Another example goal could be to reduce the difficulty and cost of maintaining and improving the performance of the industrial process 302 and the model-based controller(s) 106 in the control and automation system 304. In specific embodiments, this approach can help to improve collaboration between the operations management, process engineering, and control engineering personnel in order to maintain and improve the performance of the industrial process 302 while leveraging the model-based controller(s) 106 to achieve the best effect. Note, however, that the approaches described in this patent document could be used in any other suitable manner.

Any suitable analyses could occur using the data about the industrial process 302 and the control and automation system 304. As noted above, the benefits that can be obtained using model-based controllers often decline over time, which can be due to a number of factors. Example factors can include constraint/limit issues, model quality issues, inferential quality issues, improper manipulated or controlled variable operating mode issues, and optimizer tuning issues. Constraint/limit issues can occur when manipulated or controlled variable limits are not set properly. Model quality issues can occur when there is a mismatch between models used by a controller and the actual behavior of an industrial process, which can cause some controllers to exhibit high variability and/or to push wrong constraints. Inferential quality issues can occur when controllers infer values of certain process variables, and high variance, bias, or other problems can prevent the controllers from achieving their full benefit. Improper manipulated or controlled variable operating mode issues can occur when an operator removes a manipulated or controlled variable from a control matrix (preventing it from being used by a controller). Optimizer tuning issues can occur when linear objective coefficients are not set as Product Value Optimization (PVO) values in a controller, which in some conditions can cause the controller to push incorrect constraints.

In order to analyze data to identify limit issues, the analysis could involve the use of the "digital twin" optimizer associated with a controller 106. The optimizer could use linear objective coefficients that are set up as PVO with real-world prices (possibly with integration with SAP or other system). The optimizer could read current average values, limits, and other required parameters from the controller 106, perturb the limits successively, and calculate the difference in an objective function with each perturbation. The optimizer could then rank the limits based on changes in the objective function's values and identify/output the top issues (such as the top three to five issues).

In order to analyze data to identify tuning issues, a current objective function value could be calculated after setting up PVO coefficients, and a final objective function value could be calculated after solving the optimizer without any other changes. The difference between the two values can be calculated and used as the lost opportunity cost due to improper optimizer tuning.

In order to analyze data to identify inferential quality issues, a long-term standard deviation of bias between laboratory/analyzer and predicted values could be calculated. Using a rule of thumb or benchmark, a percentage reduction in the standard deviation can be assumed, and the average shift can be calculated. A difference in the objective function in the "digital twin" optimizer can then be calculated. The inferential predictability (based on laboratory/analyzer values) versus T-statistic confidence bounds from a calibration data set can be monitored, and an alert and recalibration activity can be triggered when a model prediction score falls outside of the acceptable bounds.

In order to analyze data to identify model quality issues, current models used by a controller could be modified, or new models for the controller could be generated. A comparison could then be made to identify whether the modified or new models better represent the behavior of the industrial process 302. In order to analyze data to identify operating mode issues, manipulated or controlled variables could be added to or removed from a controller's control matrix, and a determination could be made whether the modified control matrix improves controller performance.

The examples provided above are merely illustrative of the types of analyses that could occur using data about the industrial process 302 and the control and automation system 304. Of course, any other or additional analyses could also occur using this data.

Note that the analysis functionality could be deployed in various ways depending on the implementation. For example, the analysis functionality could be accessed by workstations or other computing devices via a web server. A batch execution engine could be used to execute various analysis routines, and an SQL or other database could be used to store and retrieve data for the analysis routines. The data analyzed by the analysis routines could be collected from UNIFIED REAL TIME (URT) platforms from HONEYWELL INTERNATIONAL INC., which could communicate data using Object Linking and Embedding (OLE) for Process Control (OPC) for storage in one or more process historians. The workstations or other computing devices, web server, platforms, and other devices could reside on the same level of a control and automation system, different levels of a control and automation system, or inside and outside a control and automation system. Additional features can also be used to facilitate more effective use of the analysis functionality. For instance, a knowledge repository could be used to capture knowledge from operational experiences and formalize the knowledge into engineering guidance notes, which can help to improve use and reduce troubleshooting efforts. Moreover, templates can be used to simplify analysis designs, a seed model library can be used to provide possible standard or custom analysis functions, and workflow support tools can be provided to guide less experience engineers or other users through the analysis implementation process. Note, however, that these details relate to specific implementations of the analysis functionality and that the analysis functionality could be deployed in any other suitable manner.

Although FIG. 3 illustrates one example of a process 300 for identifying and using impacts and causes of variability or control giveaway on model-based controller performance, various changes may be made to FIG. 3. For example, the data used in the analyses could be collected from any suitable source(s) and in any suitable manner. Also, the results of the analyses could be used in any suitable manner.

Figure 4:
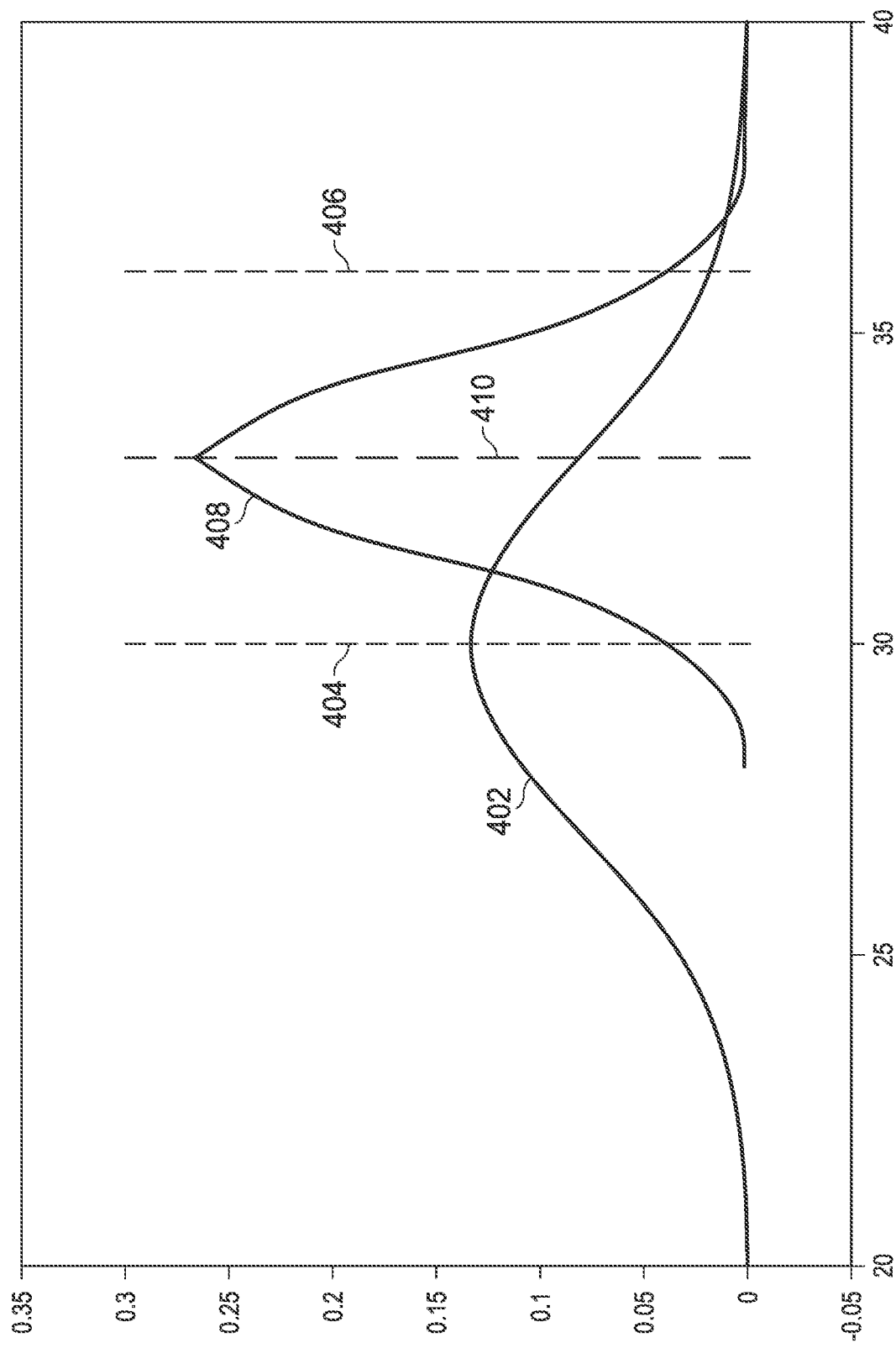
FIG. 4 illustrates an example technique for measuring model-based controller performance according to this disclosure.

FIG. 4 illustrates an example technique for measuring model-based controller performance according to this disclosure. In particular, FIG. 4 illustrates an example technique for defining or measuring control giveaway, which can be used in the analyses mentioned above and described in more detail below.

As shown in FIG. 4, a line 402 represents the distribution of a particular process variable's value (such as a particular controlled variable's value) over time without any model-based control. In this example, the line 402 defines a Gaussian distribution for the process variable's value, although this need not be the case. A vertical line 404 represents the average value of the process variable's value as defined by the line 402. Another vertical line 406 represents a constraint (such as an upper limit) placed on the process variable's value. In this case, given the Gaussian distribution and standard deviation of the line 402, the constraint defined by the line 406 is violated approximately 2.4% of the time. Assume that there is an incentive to increase the process variable's average value, but not at the expense of increasing the percentage of time that the constraint defined by the line 406 is violated.

A line 408 in FIG. 4 represents the distribution of the particular process variable's value after a successful implementation of a model-based controller used to control the process variable. In this example, the line 408 defines a Gaussian distribution for the process variable's value, although this need not be the case. A vertical line 410 represents the average value of the process variable's value as defined by the line 408. In this example, the standard deviation of the process variable's value has been reduced by about 50%, while the same percentage of constraint violations has been maintained.

As noted above, the "control giveaway" is defined as the distance or difference between an actual or average operating point of a model-based controller and its associated constraint or control limit. In FIG. 4, for example, the control giveaway is initially defined as the distance between the lines 404 and 406. After successful model-based control, the control giveaway narrows to the distance between the lines 408 and 406.

The control giveaway for a model-based controller is defined as a function of the standard deviation of a process variable's value. Thus, the control giveaway could be defined as follows:

$$\text{Control Giveaway} = \text{Limit} - \text{Average} = Z\sigma \quad (1)$$

where Limit denotes the process variable's associated constraint, Average denotes the process variable's average value, $\sigma$ denotes the standard deviation of the process variable's value, and Z denotes a multiplier (which could vary based on what risk an owner or operator of an industrial process is willing to accept). Given this, the change in performance that is obtained once a model-based controller is successfully implemented could be defined as follows:

$$\frac{\text{Control Giveaway}_{after}}{\text{Control Giveaway}_{before}} = Z\left(\frac{\sigma_{after}}{\sigma_{before}}\right) \quad (2)$$

The impact of using the model-based controller could therefore be evaluated based on the percentage of time that there is an incentive to optimize the process variable to its constraint or control limit.

Note that the behavior shown by the lines 408 and 410 in FIG. 4 may exist immediately after the model-based controller has been implemented. However, as described above, the benefits that can be obtained using model-based controllers often decline over time. As a result, the process variability and the control giveaway may change due to a number of factors. Example factors could include changes to the amplitudes and frequencies of external disturbances, such as changes due to ambient conditions or equipment issues. Equipment issues could include valves that stick, orifice plate meters that measure outside their accurate ranges, or control loops that are poorly tuned. Example factors could also include changes in process operations that cause instability within an industrial process. Example factors could further include degraded controller performance due to the presence of process noise and process-model mismatch. As a result, the improvement in the control giveaway shown in FIG. 4 can be reduced over time.

As described in more detail below, this disclosure provides techniques for detecting changes in process variability or control giveaway independent of the type of process variable value distribution or the model-based controller tuning. Instead, these techniques use a comparison between benchmarked and current closed-loop model-based controller performance, as well as mechanisms to help identify and understand possible causes of performance variations or control giveaway.

In general, these techniques involve determining a measure of the actual variability or control giveaway for each controlled variable during times when a controller has pushed that controlled variable to a limit (such as an upper or lower constraint). During those times, the standard deviation of each controlled variable's predicted value is determined, and Equation (1) is used to provide estimates of the values of Z. In any given analysis period, there may only be a few or no time periods when this analysis can be completed. However, over the longer term, estimates of Z can be determined and adapted to reflect the tuning of the model-based controller and the process noise distribution. Equation (1) can then be used to estimate the current control giveaway based on a current estimate of the standard deviation and the historical estimate of Z. This current control giveaway can be used (relative to a benchmark case) to assess lost economic opportunities or other lost opportunities associated with the model-based controller.

Although FIG. 4 illustrates one example of a technique for measuring model-based controller performance, various changes may be made to FIG. 4. For example, the lines shown in FIG. 4 and the process variable values and constraints associated with those lines are for illustration only. Process variables could have any other suitable values, and any other suitable constraints (including upper and/or lower constraints) could be used with each process variable.

Figure 5:
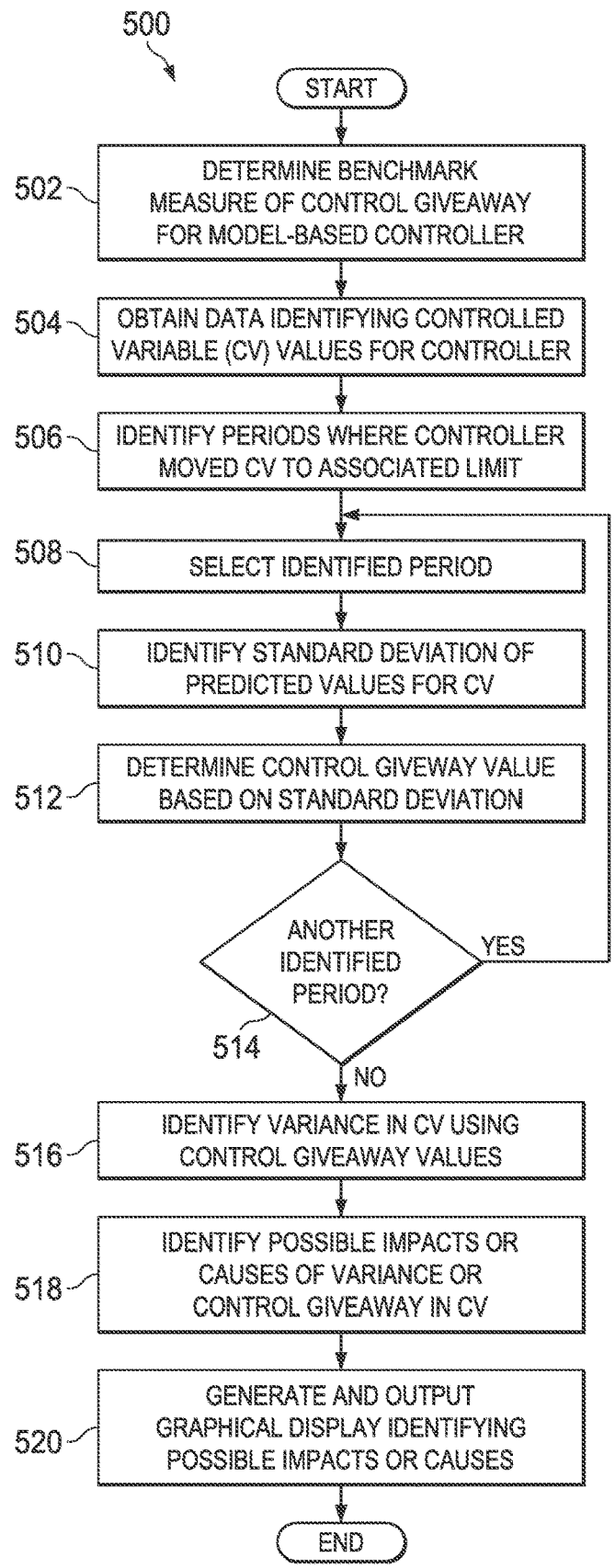
FIG. 5 illustrates an example method for identifying impacts and causes of variability or control giveaway on model-based controller performance according to this disclosure.

FIG. 5 illustrates an example method 500 for identifying impacts and causes of variability or control giveaway on model-based controller performance according to this disclosure. For ease of explanation, the method 500 is described as being performed by the device 200 of FIG. 2 implementing an operator console 110, server 116, or device used in the computing cloud 118 of FIG. 1. However, the method 500 could be used with any suitable device and in any suitable system.

As shown in FIG. 5, a benchmark measure of control giveaway for a model-based process controller is determined at step 502. This could include, for example, the processor 202 of the device 200 performing the operations described below to calculate the control giveaway for a model-based controller 106. The benchmark measure of control giveaway for the controller 106 could be determined during or shortly after commissioning or re-tuning of the controller 106 or at other times when the controller 106 is known or believed to be operating properly.

Data identifying the values of a controlled variable over time for the controller is obtained at step 504. This could include, for example, the processor 202 of the device 200 receiving the controlled variable values directly from the model-based controller 106 or indirectly, such as via a historian 114, server 116, or gateway 120. This could also include the processor 202 of the device 200 pre-processing the data, such as to validate the obtained data and discard any portions of the obtained data deemed invalid. In some embodiments, the data can be validated by using predictions generated by the model-based controller 106 to identify valid or invalid data, retaining any valid data, and discarding any invalid data. Note that when the data is obtained by a device that is remote from the controller 106 or other data source, the data can be transmitted to the device securely and in real-time, near real-time, or non-real-time depending on the embodiment.

The data can be processed continuously, periodically, or at other suitable times to assess the variability of the controller's controlled variable and the control giveaway of the controller 106. In this example, this processing occurs as follows. Time periods where the model-based controller moved the controlled variable to an associated limit are identified at step 506. This could include, for example, the processor 202 of the device 200 identifying a start of a period as the first time or interval when the value of the controlled variable is at an associated limit, such as an upper or lower constraint. This could also include the processor 202 of the device 200 identifying an end of the period as the first time or interval when the value of the controlled variable is not at the associated limit. The identified time periods denote intervals where the model-based controller 106 successfully pushed the controlled variable to its constraint.

An identified time period is selected at step 508, and the standard deviation of predicted values for the controlled variable is determined at step 510. This could include, for example, the processor 202 of the device 200 selecting the first identified time period when the controller 106 pushed the controlled variable to the associated limit. This could also include the processor 202 of the device 200 using a digital twin of the controller's optimizer to generate the predicted values of the controlled variable within that time period and calculating the standard deviation of those predicted values. A control giveaway value is determined based on the standard deviation at step 512. This could include, for example, the processor 202 of the device 200 identifying an offset between the controlled variable's average value and the associated limit based on the standard deviation. If there is another time period to be examined at step 514, the process returns to step 508 to select and analyze the next time period.

Otherwise, the variance of the controlled variable is determined using the control giveaway values at step 516. This could include, for example, the processor 202 of the device 200 using Equation (1) above to calculate the control giveaway for the controlled variable. Possible impacts resulting from the controlled variable variance or control giveaway and/or possible causes of the controlled variable variance or control giveaway are identified at step 518. This could include, for example, the processor 202 of the device 200 analyzing data to identify which process variables or other causes might be creating the variance or control giveaway in the controller's controlled variable. This could also include the processor 202 of the device 200 analyzing data to identify the impacts of the variance or control giveaway in the controlled variable on material usage, energy usage, or economic factors related to an industrial process. Note that a comparison of the current control giveaway to the benchmarked control giveaway can occur here in order to identify the differences between the controller's current operations and the controller's prior benchmarked operations (which provide a measure of how the controller's operations could be improved). A graphical display identifying one or more impacts or causes for the variance or control giveaway is generated and presented to one or more users at step 520. This could include, for example, the processor 202 of the device 200 generating a graphical user interface that identifies the possible impacts and/or possible causes of the process variability or control giveaway in a control-relevant context.

Note that the process shown in FIG. 5 could be used to process data for one controlled variable or for multiple controlled variables (either sequentially or in parallel). In this way, the method 500 can be used to identify process variability in one or more controlled variables and the control giveaway resulting from that process variability. The process variability or control giveaway could then be analyzed to identify potential causes or impacts, and at least one visualization can be generated for one or more users identifying the potential causes or impacts. Ideally, this information can be used to help take one or more actions that reduce the process variability or control giveaway and thereby reduce the impacts of that process variability or control giveaway, which improves the operation of the model-based controller(s) as well as the underlying industrial process(es).

Although FIG. 5 illustrates one example of a method 500 for identifying impacts and causes of variability or control giveaway on model-based controller performance, various changes may be made to FIG. 5. For example, while shown as a series of steps, various steps in FIG. 5 could overlap, occur in parallel, occur in a different order, or occur any number of times.

Figure 6:
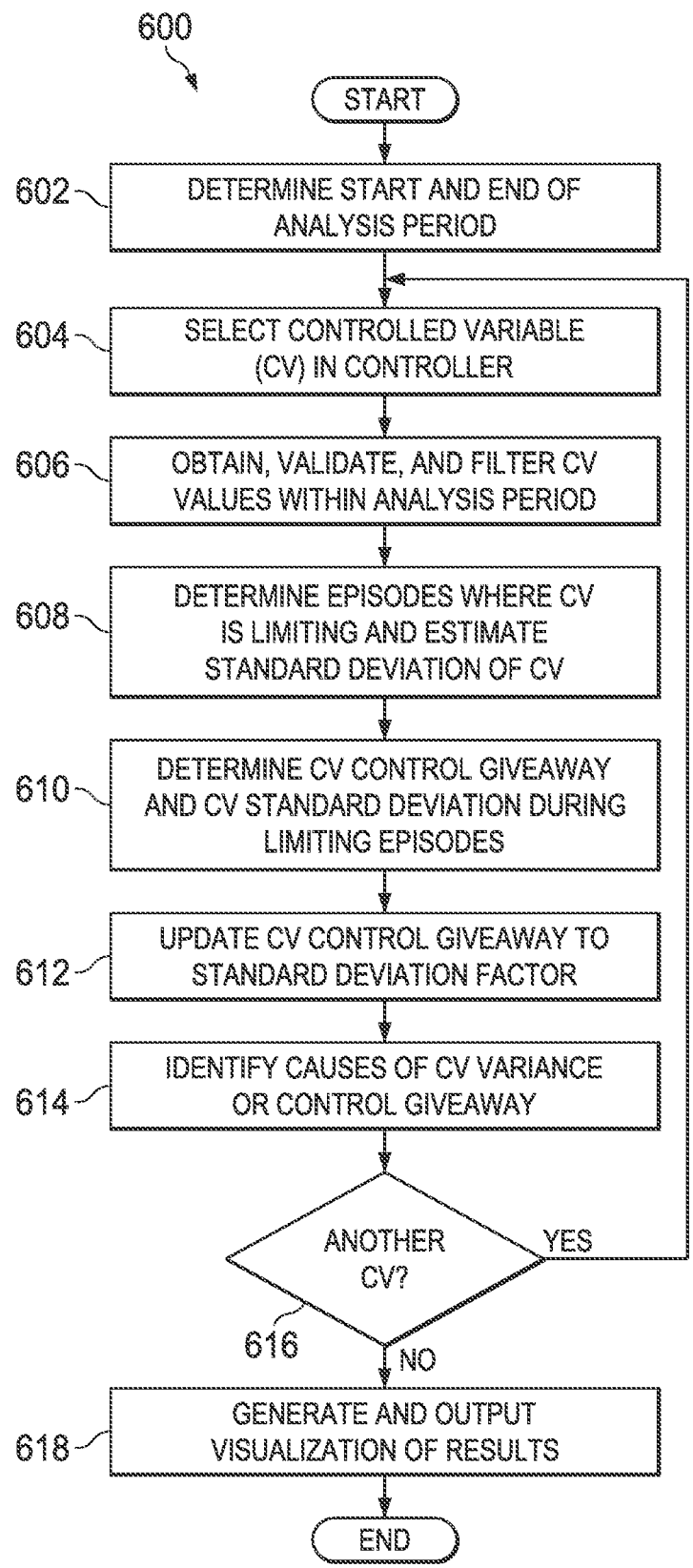
FIG. 6 illustrates an example method for processing data to identify impacts and causes of variability or control giveaway on model-based controller performance according to this disclosure.

FIG. 6 illustrates an example method 600 for processing data to identify impacts and causes of variability or control giveaway on model-based controller performance according to this disclosure. More specifically, the method 600 could represent a specific implementation of part of the method 500 in which data associated with a model-based controller is analyzed. For ease of explanation, the method 600 is described as being performed by the device 200 of FIG. 2 implementing an operator console 110, server 116, or device used in the computing cloud 118 of FIG. 1. However, the method 600 could be used with any suitable device and in any suitable system.

Figure 7A:
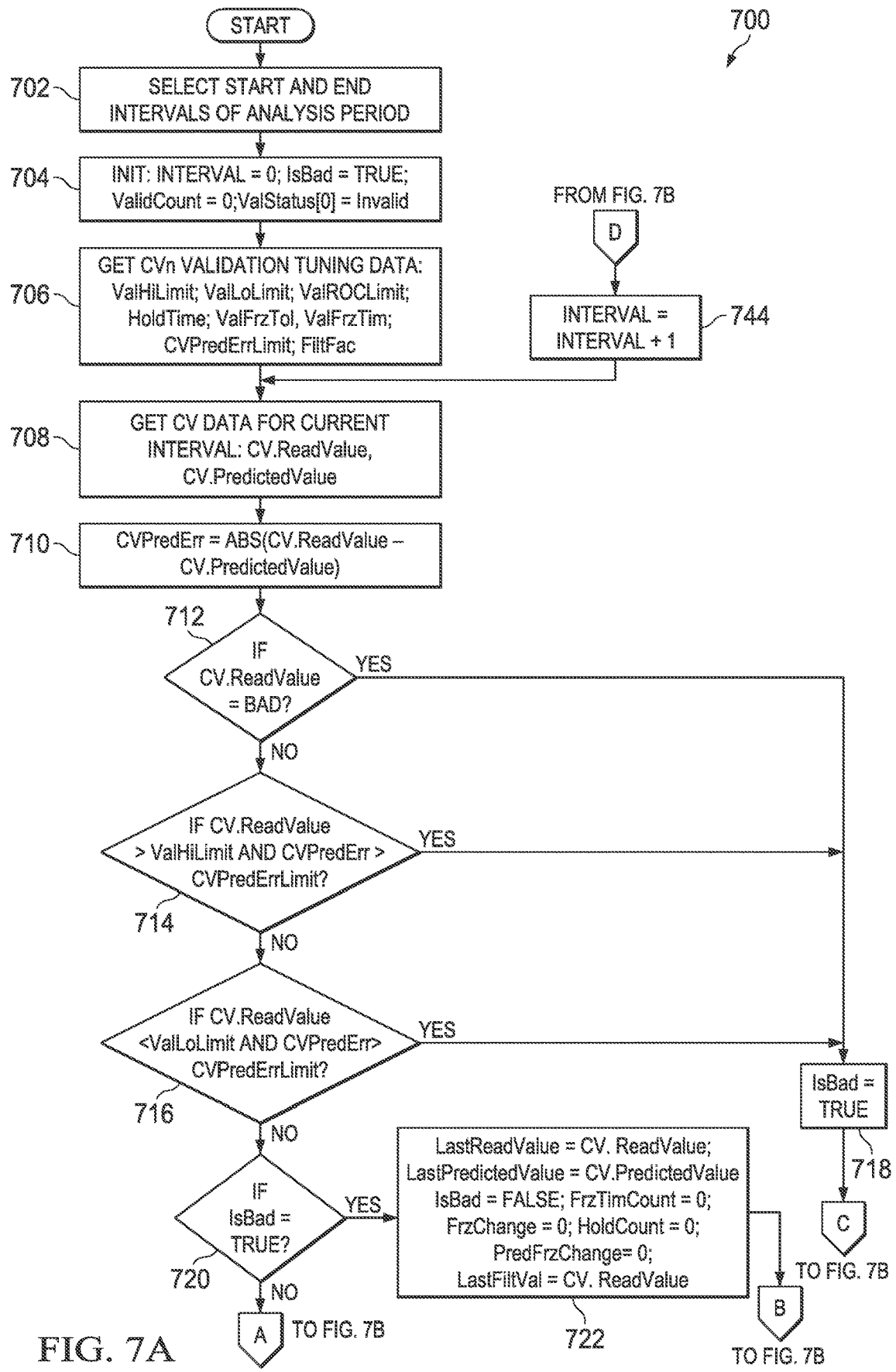
FIGS. 7A and 7B illustrate an example method for validating and filtering a process variable's value according to this disclosure.
Figure 7B:
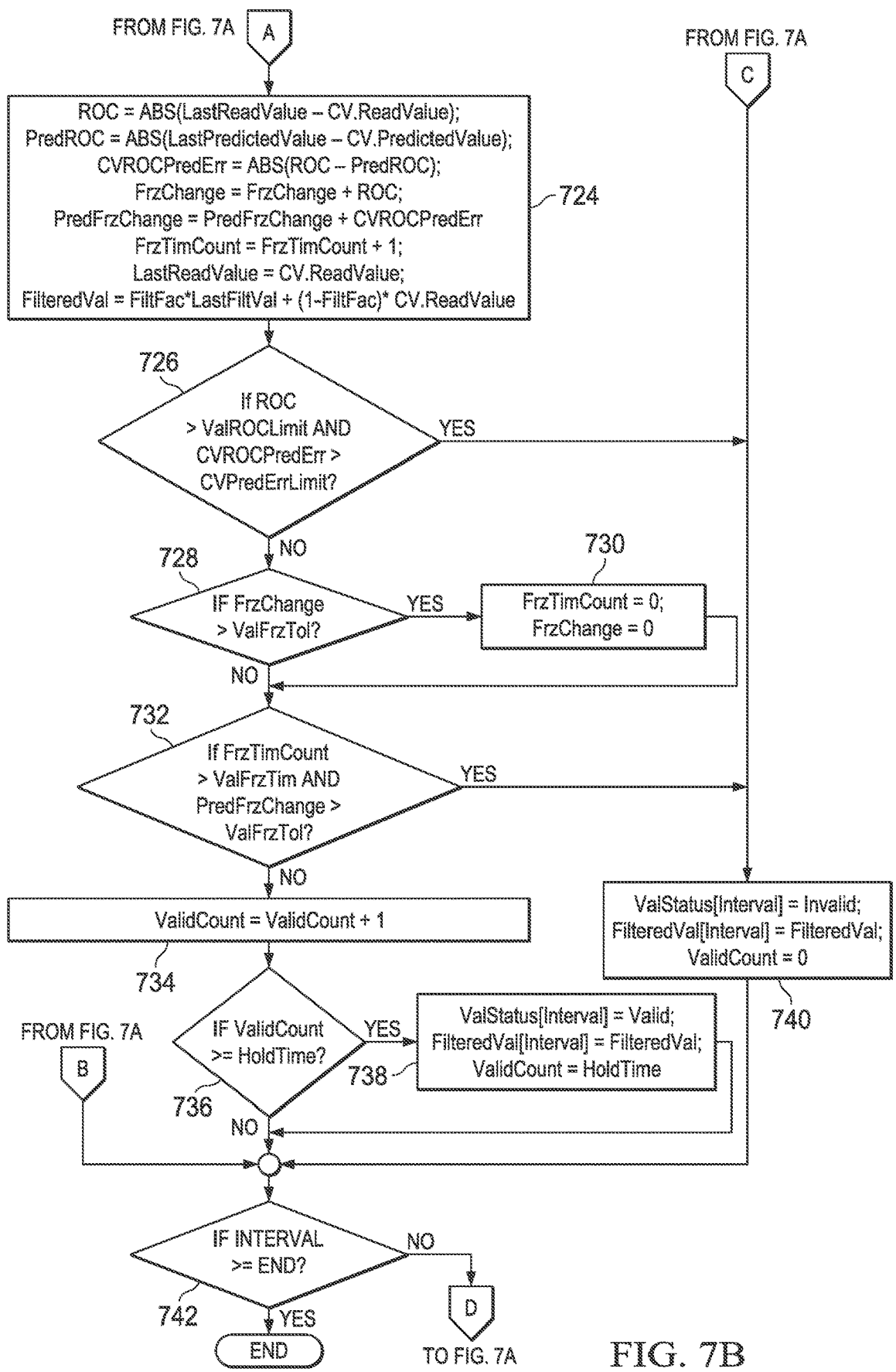

As shown in FIG. 6, a start and an end of an analysis period are identified at step 602. This could include, for example, the processor 202 of the device 200 determining the period during which data associated with a model-based controller 106 will be analyzed. Any suitable period of time could be identified here, such as a particular day, week, month, or other period of time. A controlled variable for the controller is selected at step 604. This could include, for example, the processor 202 of the device 200 selecting one of the controlled variables that the controller 106 is responsible for controlling. Values of the selected controlled variable within the identified analysis period are obtained, validated, and filtered at step 606. This could include, for example, the processor 202 of the device 200 removing any gross instrument errors from the data, which may give false indications of controlled variable variability. One example technique for validating and filtering controlled variable values is shown in FIGS. 7A and 7B, which are described below.

Figure 8A:
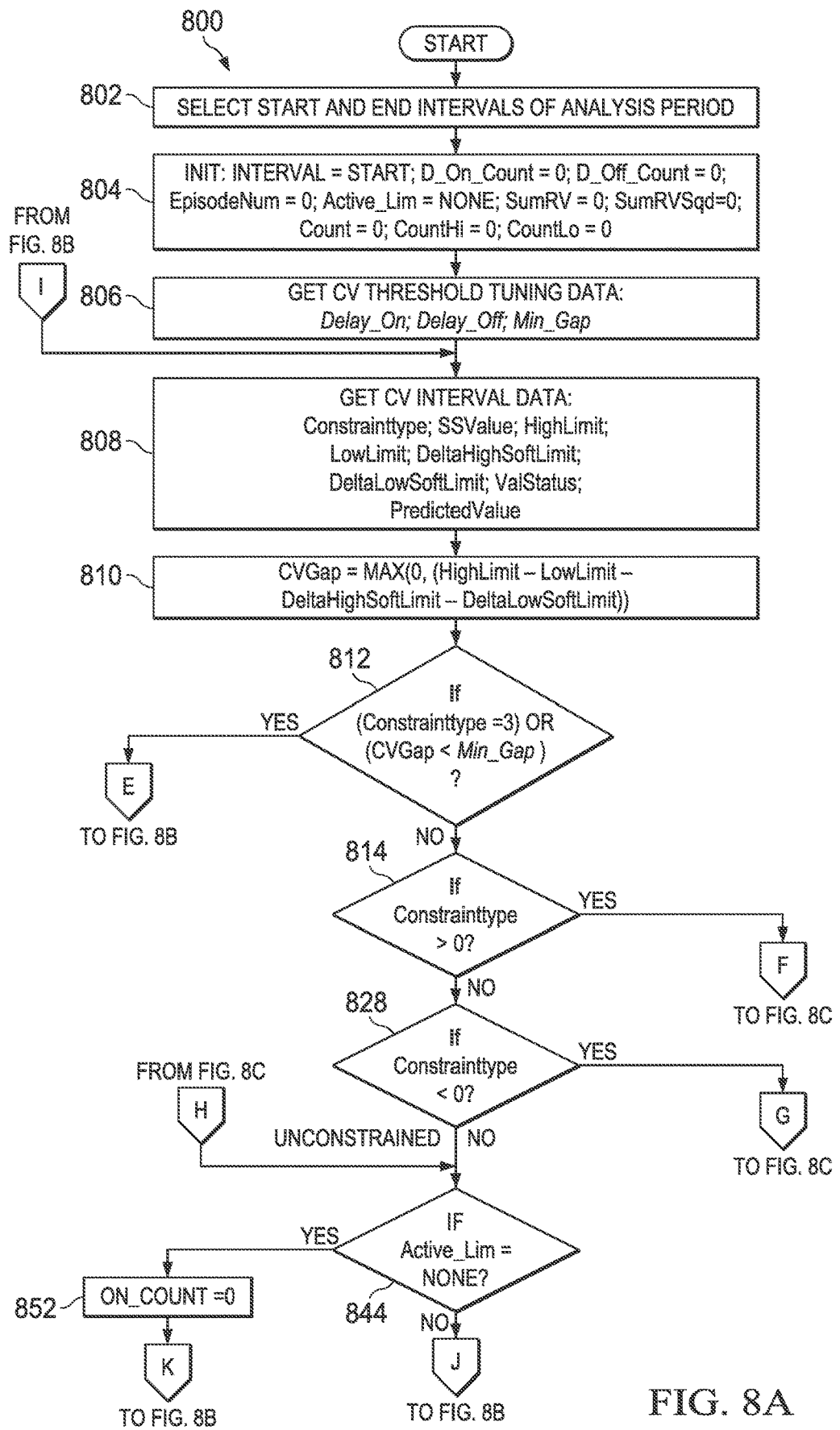
FIGS. 8A through 8C illustrate an example method for determining episodes when a process variable's value is limiting and for estimating the process variable's standard deviation according to this disclosure.
Figure 8B:
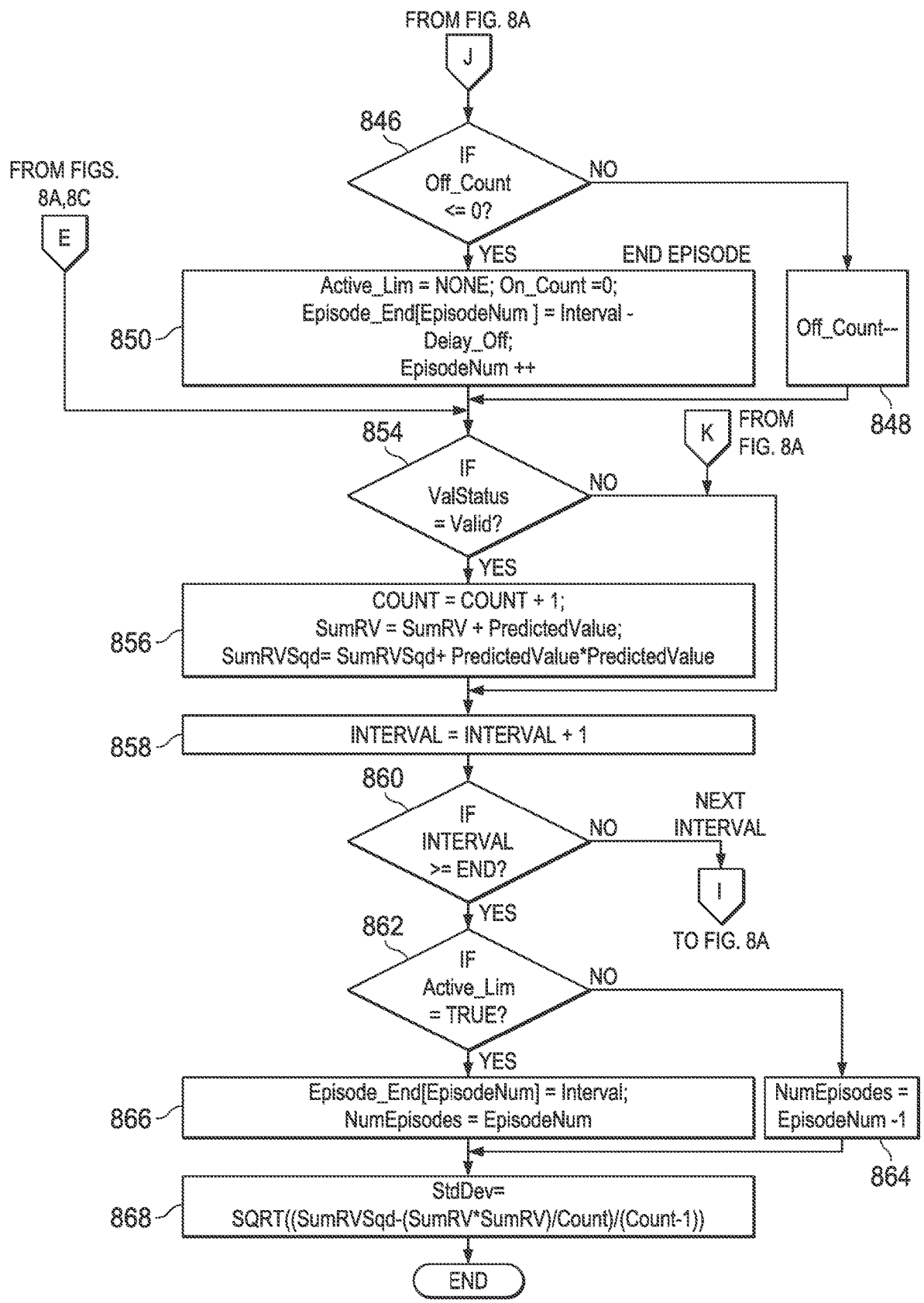
Figure 8C:
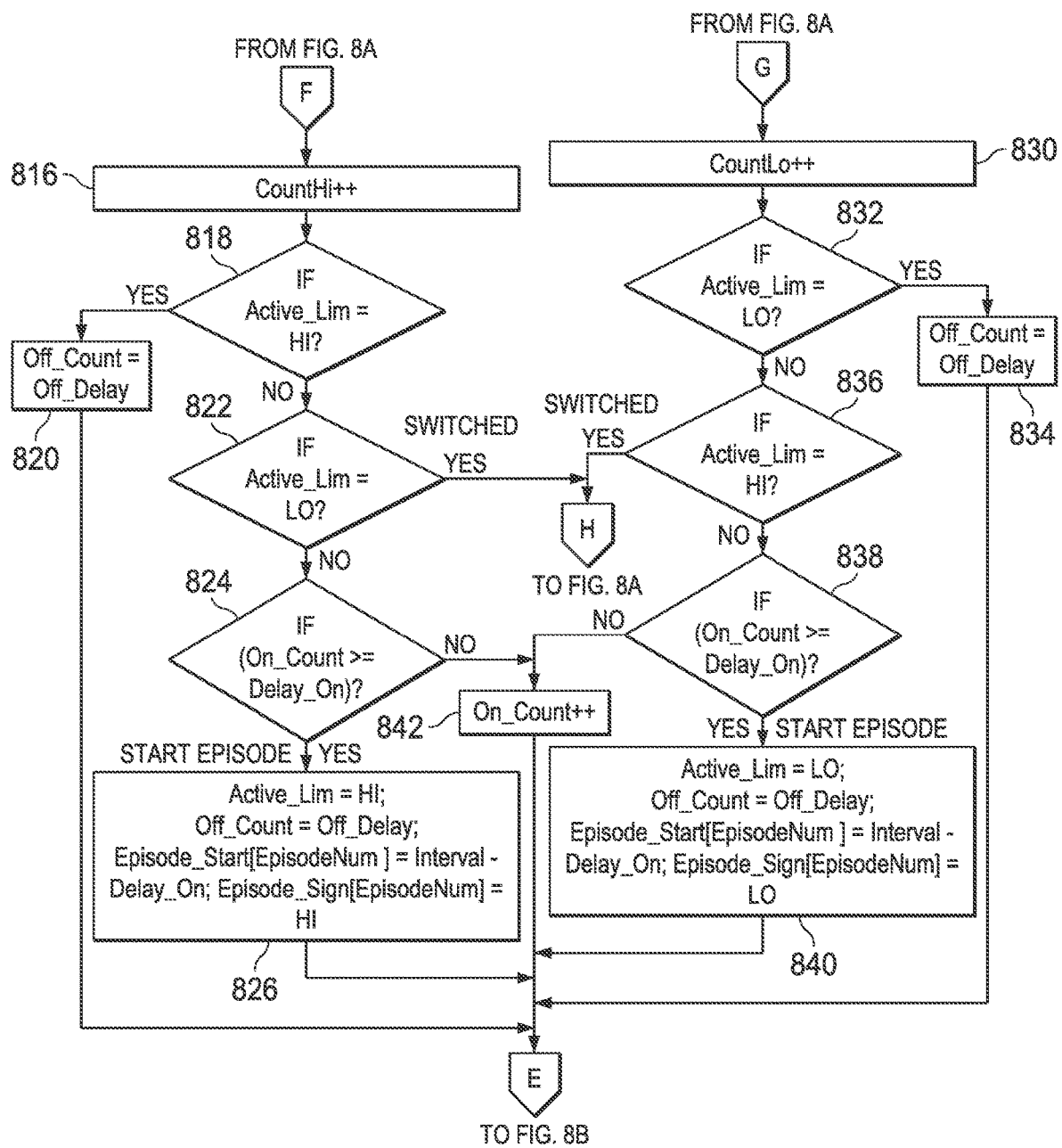

Episodes where the selected controlled variable is limiting are identified and an estimate of the standard deviation of the selected controlled variable during the analysis period is identified at step 608. This could include, for example, the processor 202 of the device 200 analyzing the data during the analysis period to identify times when the optimizer of the model-based controller 106 is constraining the selected controlled variable at a hard or soft limit. As noted above, the device 200 could use a digital twin of the controller's optimizer to perform this operation. This could also include the processor 202 of the device 200 calculating the standard deviation of the selected controlled variable's values during the analysis period. One example technique for identifying the episodes and calculating the standard deviation is shown in FIGS. 8A through 8C, which are described below.

Figure 9A:
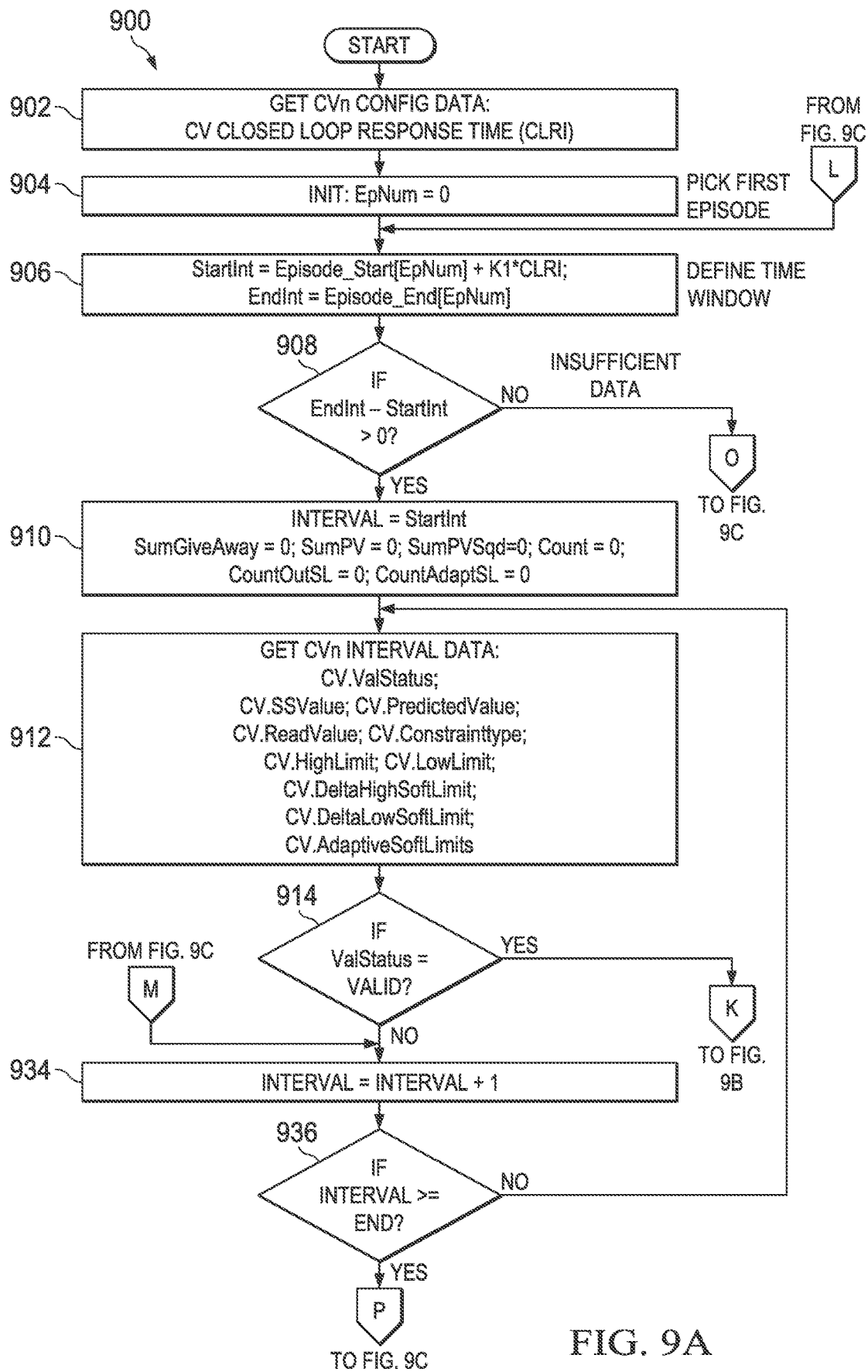
FIGS. 9A through 9C illustrate an example method for determining a process variable's control giveaway and standard deviation during limiting episodes according to this disclosure.
Figure 9B:
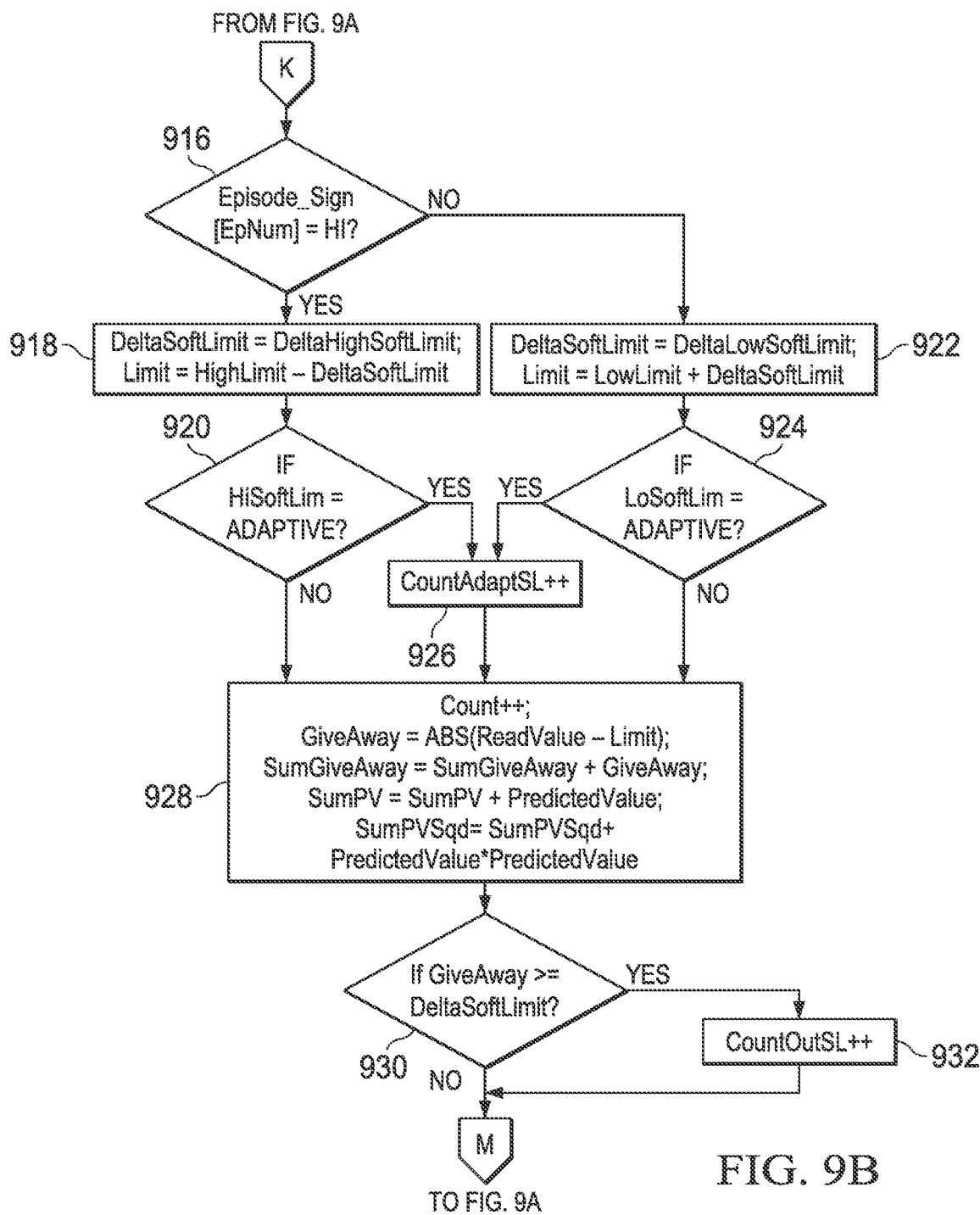
Figure 9C:
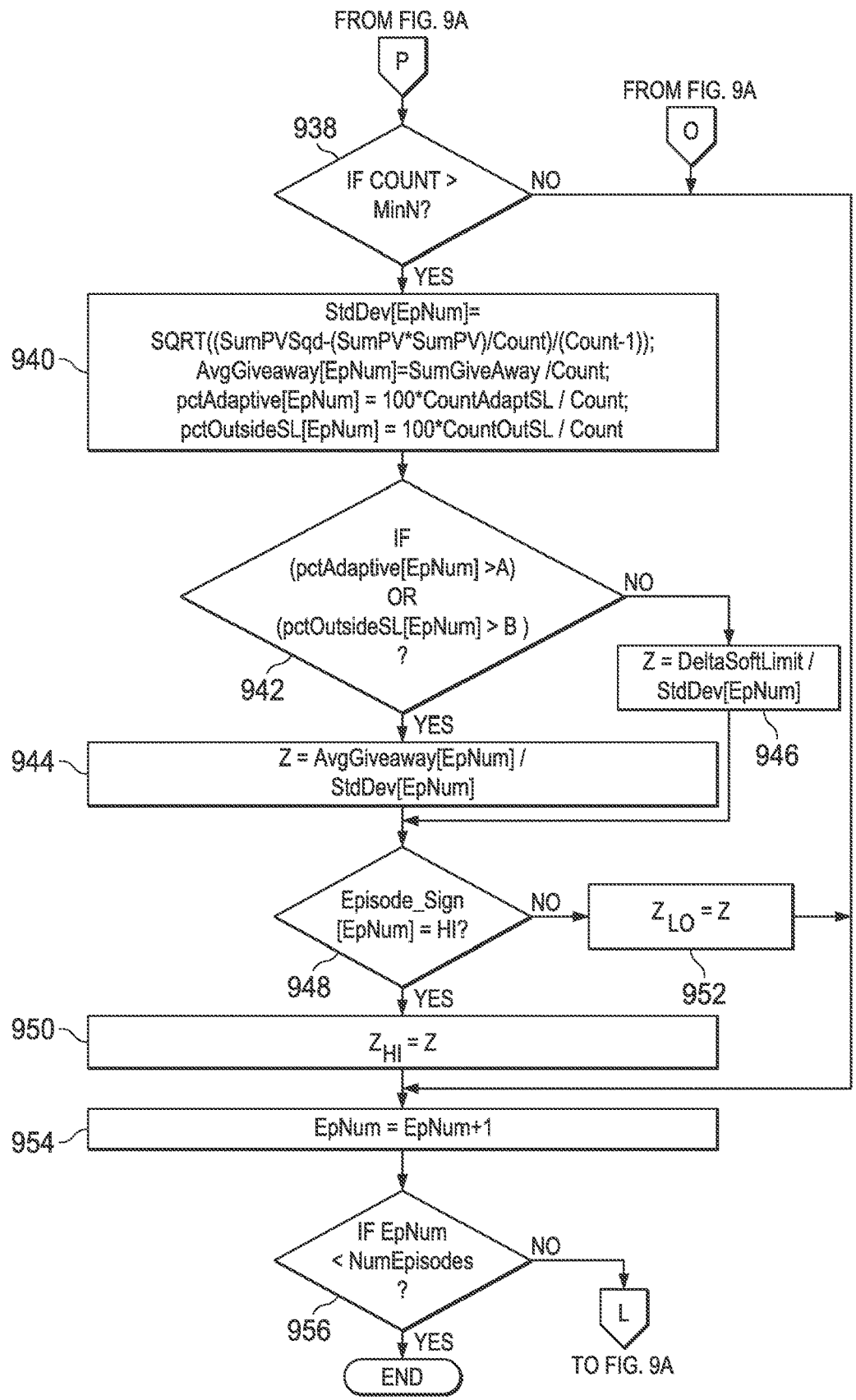

The control giveaway and the standard deviation of the controlled variable are determined for each identified episode at step 610. This could include, for example, the processor 202 of the device 200 estimating the average distance or control giveaway between the average value of the selected controlled variable and its hard or soft limit during each identified episode. This could also include the processor 202 of the device 200 using the estimated control giveaway to calibrate a standard deviation-based measure of the offset between the constraint and the average value of the selected controlled variable. The control giveaway during each identified episode can be calculated using Equation (1) above. This approach allows the calculation of the control giveaway to adapt over time, making it less variant or invariant to noise distribution profiles or controller tunings. One example technique for identifying the control giveaway and the standard deviation of a controlled variable during each episode is shown in FIGS. 9A through 9C, which are described below.

The control giveaway values could be updated based on the standard deviation for the controlled variable during the entire analysis period at step 612. This could include, for example, the processor 202 of the device 200 scaling the calculated control giveaway values based on a comparison of the standard deviation of the controlled variable during the identified episodes to the standard deviation of the controlled variable during the entire analysis period.

Figure 10:
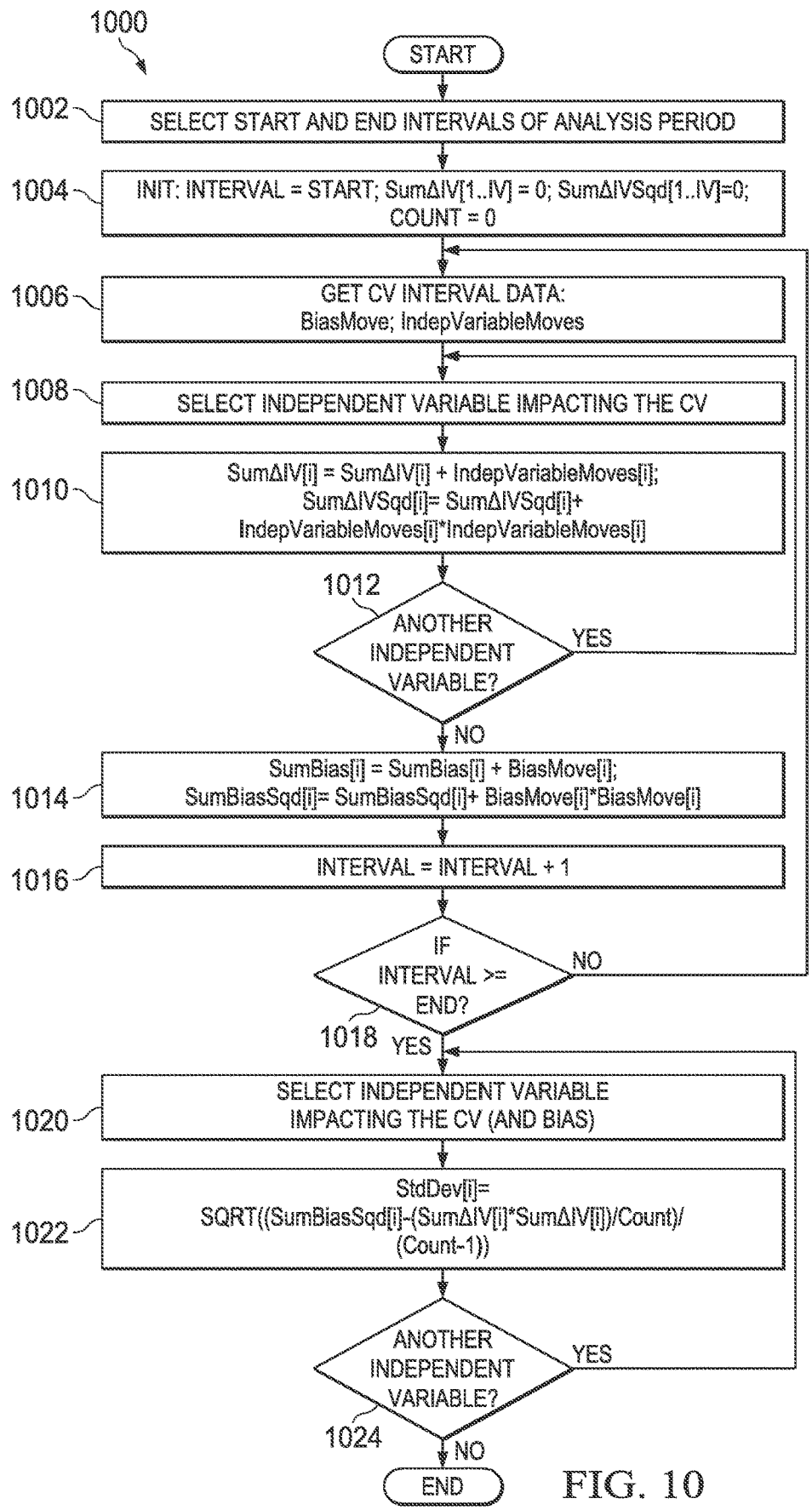
FIG. 10 illustrates an example method for identifying causes of a process variable's variance according to this disclosure.

Causes of the variance in the controlled variable's values and/or the control giveaway of the controlled variable are identified at step 614. This could include, for example, the processor 202 of the device 200 analyzing data to identify what might be creating the variance in the controlled variable's values or what might be creating the control giveaway. In some embodiments, the variance contributions of measured and unmeasured effects can be calculated as standard deviations. One example technique for identifying the possible causes of process variable variance and/or control giveaway is shown in FIG. 10, which is described below.

If there is another controlled variable to be processed at step 616, the process returns to step 604 to select another controlled variable. Otherwise, at least one visualization of the results is generated and output at step 618. This could include, for example, the processor 202 of the device 200 generating a graphical user interface that enables a user to drill-down from an overview display to explore root causes of process variance or control giveaway for one or more of the controlled variables. One example of the graphical user interface is described below, although as noted above various types of graphical user interfaces could be used.

Although FIG. 6 illustrates one example of a method 600 for processing data to identify impacts and causes of variability or control giveaway on model-based controller performance, various changes may be made to FIG. 6. For example, while shown as a series of steps, various steps in FIG. 6 could overlap, occur in parallel, occur in a different order, or occur any number of times.

FIGS. 7A and 7B illustrate an example method 700 for validating and filtering a process variable's value according to this disclosure. The method 700 could, for example, be performed during step 606 in the method of FIG. 6. For ease of explanation, the method 700 is described as being performed by the device 200 of FIG. 2 implementing an operator console 110, server 116, or device used in the computing cloud 118 of FIG. 1. However, the method 700 could be used with any suitable device and in any suitable system.

To summarize the method 700, a controlled variable's value can be checked against high and low sensible engineering bounds, a "bad" signal as reported by a control system, a high rate-of-change limit, and a minimum rate-of-change limit. The sensible engineering bounds can represent high and low limits based on the normal operating envelope of the controlled variable or a range that is slightly wider than the normal operating envelope. These bounds are typically more conservative than the instrument range for the actual equipment in an industrial process. The "bad" signal represents a signal that many control systems are able to generate and simply indicates that the current value of the controlled variable is invalid. Most process variables change significantly more slowly than the responsiveness of the process measurements because of process dynamics, so the high rate-of-change limit can be used to identify changes that occur excessively fast. Similarly, most process variables exhibit some movement due to process disturbances and control actions, so a completely static measurement value could indicate an instrumentation failure. During this process, the validation approach here uses a controller's predictions in order to detect valid and invalid data. For example, if a measured controlled variable value is above the sensible high engineering limit but is actually predicted by the controller within some tolerance, the data can be considered valid. If a measurement rate-of-change is high but predicted by the controller, the data can be considered valid. If a measurement value appears to be frozen but the predicted value is invariant, the data can be considered valid.

As shown in FIGS. 7A and 7B, start and end intervals of an analysis period are selected at step 702. This could include, for example, the processor 202 of the device 200 identifying the sampling or control interval that occurs at the beginning of the analysis period previously identified in step 602 and the sampling or control interval that occurs at the end of the analysis period previously identified in step 602. The start and end intervals define the total number of intervals to be examined.

Various values are initialized at step 704. This could include, for example, the processor 202 of the device 200 initializing an Interval value, which is used to represent the specific sampling or control interval being examined. This could also include the processor 202 of the device 200 initializing an IsBad flag, which is used to identify whether data during the specific sampling or control interval is valid or invalid. This could further include the processor 202 of the device 200 initializing a ValidCount value, which is used to count the number of intervals containing valid data. In addition, this could include the processor 202 of the device 200 initializing a ValStatus array, which is used to identify whether each sampling or control interval contains valid or invalid data.

Tuning data for a specific controlled variable is obtained at step 706. This could include, for example, the processor 202 of the device 200 obtaining high and low limits (denoted ValHiLimit and ValLoLimit) for the controlled variable, which identify the upper and lower constraints placed on the controlled variable. This could also include the processor 202 of the device 200 obtaining a maximum rate-of-change limit (denoted ValROCLimit) for the controlled variable, which identifies how fast the controlled variable is allowed to change. This could further include the processor 202 of the device 200 obtaining a hold time value (denoted HoldTime), which identifies a consecutive number of sampling or control intervals during which valid data should exist before the intervals are actually identified as containing valid data. This can help to avoid identifying short bursts of data as being valid. This could also include the processor 202 of the device 200 obtaining a frozen tolerance value (denoted ValFrzTol) and a frozen time value (denoted ValFrzTim), which identify values used to determine whether unchanging values of the controlled variable are acceptable or indicative of invalid data. This could further include the processor 202 of the device 200 obtaining a prediction error limit (denoted CVPredErrLimit), which identifies a maximum allowable error between actual and predicted values of the controlled variable for data to be valid. In addition, this could include the processor 202 of the device 200 obtaining a filter factor value (denoted FiltFac), which identifies how controlled variable values are filtered over time. This data could be obtained from any suitable source(s), such as directly from the model-based controller 106 or indirectly, such as via a historian 114, server 116, or gateway 120.

Controlled variable data for the current interval (as defined by the Interval value) is obtained at step 708. This could include, for example, the processor 202 of the device 200 obtaining the actual value of the controlled variable during the current interval (denoted CV.ReadValue) and the predicted value of the controlled variable during the current interval (denoted CV.PredictedValue). The actual value of the controlled variable could be based on a sensor measurement or an inferential calculation. The predicted value of the controlled variable could be obtained from a controller or calculated using a digital twin of the controller's optimizer. A prediction error is calculated at step 710. This could include, for example, the processor 202 of the device 200 calculating the absolute value of the difference between CV.ReadValue and CV.PredictedValue.

In step 712, a determination is made whether the control system has flagged the actual value of the controlled variable during the current interval as being invalid. In step 714, a determination is made whether the actual value of the controlled variable during the current interval exceeds its upper limit and whether the prediction error exceeds the prediction error limit (since it may be possible that exceeding the upper limit is expected). In step 716, a determination is made whether the actual value of the controlled variable during the current interval falls below its lower limit and whether the prediction error exceeds the prediction error limit (since it may be possible that falling below the lower limit is expected). If any of these conditions is true, the IsBad flag is set to true in order to indicate that the current interval contains invalid data at step 718, and the process skips to step 740. These steps can be performed by the processor 202 of the device 200 using the various data values introduced above.

If none of these conditions is true, the current interval may contain valid data. A check is made whether the IsBad flag is set to true at step 720. Note that during the first iteration, the IsBad flag is true as shown in step 704, but the IsBad flag could be false during subsequent iterations. Assuming this is the first iteration or the IsBad flag was set to true during a prior iteration, various values are assigned at step 722. This could include, for example, the processor 202 of the device 200 setting a last read value (denoted LastReadValue) of the controlled variable to equal the current actual value of the controlled variable and setting a last predicted value (denoted LastPredictedValue) of the controlled variable to equal the current predicted value of the controlled variable. This could also include the processor 202 of the device 200 setting the IsBad flag to false and assigning a last filtered value (denoted LastFilVal) of the controlled variable to the current actual value of the controlled variable. This could further include the processor 202 of the device 200 assigning a value of zero to a frozen counter (denoted FrzTimCount), a frozen change value (denoted FrzChange), a predicted frozen change value (denoted PredFrzChange), and a hold counter (denoted HoldCount). These operations are performed since the current interval is possibly the first interval in a series of intervals containing valid data.

Otherwise, various values are calculated at step 724. This could include, for example, the processor 202 of the device 200 calculating a rate-of-change value (denoted ROC) of the controlled variable as the absolute value of the difference between the last read value of the controlled variable and the current actual value of the controlled variable. This could also include the processor 202 of the device 200 calculating a predicted rate-of-change value (denoted PredROC) of the controlled variable as the absolute value of the difference between the last predicted value of the controlled variable and the current predicted value of the controlled variable. A prediction error for the rate-of-change (denoted CVROCPredErr) can be calculated as the absolute value difference between the ROC and PredROC values. The frozen change value is updated by adding the ROC value to the frozen change value, the predicted frozen change value is updated by adding the CVROCPredErr value to the predicted frozen change value, and the frozen counter is incremented. The last read value of the controlled variable is set to equal the current actual value of the controlled variable, and a current filtered value (denoted FilteredVal) of the controlled variable is calculated using the filter factor, the last filtered value, and the current actual value of the controlled variable. These operations are performed since the current interval is possibly a subsequent or final interval in a series of intervals containing valid data.

A determination is made whether the rate-of-change exceeds the rate-of-change limit and if the rate-of-change prediction error exceeds the error limit at step 726. This is done because it is possible that the measurement rate-of-change is high but is predicted, in which case the data can still be considered valid. If not, the process skips to step 740.

Otherwise, the process proceeds to step 728, where a determination is made whether the frozen change value exceeds the frozen tolerance value. If so, this indicates that the controlled variable's value is changing by some amount, so an equipment fault or other fault has not resulted in a frozen controlled variable value. In this case, the frozen counter and the frozen change value are reset to zero at step 730. A determination is made whether the frozen counter exceeds the frozen time value and whether the predicted frozen change value exceeds the frozen tolerance value at step 732. If both conditions are met, this is indicative that the controlled variable's value has frozen and that the freezing was not predicted. In that case, the process skips to step 740. Otherwise, any freezing of the controlled variable's value (if it is occurring) is predicted, so the current interval does contain valid data.

The ValidCount value is incremented at step 734, and a determination is made whether the ValidCount value exceeds the hold time value at step 736. If so, there have been an adequate number of consecutive valid intervals, so various values associated with the current interval are set at step 738. This could include, for example, the processor 202 of the device 200 marking the current interval as containing valid data, setting a current filtered value for the interval to the filtered value, and setting the ValidCount value to the hold time value. Conversely, during step 740 when there is invalid data in the current interval, the processor 202 of the device 200 could mark the current interval as containing invalid data, set the current filtered value for the interval to the filtered value, and set the ValidCount value to zero.

A determination is made whether the current interval is the last interval of the analysis period at step 742. If not, the Interval value is incremented at step 744 to select the next interval to be analyzed, and the process returns to step 708. Otherwise, the process ends. The final results of the method 700 include a set of indicators that identify which intervals of the analysis period contain valid data and/or invalid data.

FIGS. 8A through 8C illustrate an example method 800 for determining episodes when a process variable's value is limiting and for estimating the process variable's standard deviation according to this disclosure. The method 800 could, for example, be performed during step 608 in the method of FIG. 6. For ease of explanation, the method 800 is described as being performed by the device 200 of FIG. 2 implementing an operator console 110, server 116, or device used in the computing cloud 118 of FIG. 1. However, the method 800 could be used with any suitable device and in any suitable system.

To summarize the method 800, a controlled variable's measurements are analyzed to identify episodes when a controller's optimizer constrains the controlled variable's steady-state (SS) value at a hard or soft limit. This information can be used for two purposes. First, it can be used to scale a lost opportunity cost or other value associated with the controlled variable's variability down to a percentage of time that the controlled variable is at an active constraint. Second, it can be used to identify specific time windows (episodes) for further analysis. For computational efficiency, the standard deviation of the controlled variable's predicted value can be estimated as the process iterates over a data set. The predicted value (the biased-corrected controlled variable prediction) can be used in preference to the actual controlled variable value because its variance directly impacts the control giveaway.

In this example, three tuning factors are used to identify constrained controlled variable episodes. These tuning factors include a Delay_On value, a Delay_Off value, and a Min_Gap value. The Delay_On value identifies the minimum number of consecutive intervals for which a controlled variable is at a hard or soft limit before the controlled variable is deemed to be limiting. This tuning factor can help to mitigate the impacts of noise and transients in the optimization solution. When this check is passed, the first interval of the controlled variable limitation is deemed to be the start of the episode. The Delay_Off value identifies the minimum number of consecutive intervals for which the controlled variable is unconstrained before the controlled variable is deemed to not be limiting. This tuning factor can help to reduce the likelihood of process noise triggering multiple sequential episodes, which can be better described as a single consolidated episode. When this check is passed, the first interval of an unconstrained controlled variable is deemed to be the end of the episode. The Min_Gap value identifies a minimum gap between high and low optimization limits and could be based on hard or soft limits. Note that if an operator-configured gap is less than this limit or a controlled variable has a setpoint, part of the analysis can be skipped.

As shown in FIGS. 8A through 8C, start and end intervals of an analysis period are selected at step 802. This could include, for example, the processor 202 of the device 200 identifying the sampling or control interval that occurs at the beginning of the analysis period previously identified in step 602 and the sampling or control interval that occurs at the end of the analysis period previously identified in step 602. Note, however, that the same intervals identified in step 702 could be used here.

Various values are initialized at step 804. This could include, for example, the processor 202 of the device 200 initializing an Interval value, which is used to represent the specific sampling or control interval being examined. This could also include the processor 202 of the device 200 initializing D_On_Count and D_Off_Count values, which are used respectively to count the numbers of intervals in which a controlled variable is and is not at an associated constraint. This could further include the processor 202 of the device 200 initializing an episode number (denoted EpisodeNum), which is used to identify a current episode being examined. This could also include the processor 202 of the device 200 initializing an active limit value (denoted Active_Lim), which is used to identify any limit against which a controlled variable has been moved. In addition, this could include the processor 202 of the device 200 initializing SumRV, SumRVSqd, Count, CountHi, and CountLo values to zero. These values are used as described below to calculate various statistics associated with an episode.

Threshold tuning data for a controlled variable is obtained at step 806. This could include, for example, the processor 202 of the device 200 obtaining the Delay_On, Delay_Off, and Min_Gap values associated with a specific controlled variable used by a model-based controller 106. This data could be obtained from any suitable source(s), such as directly from the model-based controller 106 or indirectly, such as via a historian 114, server 116, or gateway 120.

Controlled variable data for the current interval (as defined by the Interval value) is obtained at step 808. This could include, for example, the processor 202 of the device 200 obtaining a steady-state value of the controlled variable (denoted SSValue), the controlled variable's status during the current interval (denoted ValStatus as identified using the method 700), and the controlled variable's predicted value during the current interval (denoted Predicted Value). This could also include the processor 202 of the device 200 obtaining constraint information for the controlled variable, such as a constraint type (denoted Constrainttype), high limit (denoted HighLimit), low limit (denoted LowLimit), delta high soft limit (denoted DeltaHighSoftLimit), and delta low soft limit (denoted DeltaLowSoftLimit). This data could be obtained from any suitable source(s), such as directly from the model-based controller 106 or indirectly, such as via a historian 114, server 116, or gateway 120. At least some of this data could also be obtained using the digital twin of the controller's optimizer.

A controlled variable gap (denoted CVGap) is calculated at step 810. This could include, for example, the processor 202 of the device 200 identifying the maximum of zero and (HighLimit-LowLimit-DeltaHighSoftLimit-DeltaLowSoftLimit). A determination is made whether the constraint type indicates that the controlled variable has a setpoint (a value of "3" in this example) or whether the calculated gap is less than the Min_Gap value at step 812. If either condition is true, the process skips to step 852.

Otherwise, a determination is made whether the constraint type is greater than zero (indicating that the relevant constraint is an upper constraint) at step 814. If so, the CountHi value is incremented at step 816. A determination is made whether the active limit of the controlled variable is set to "Hi" at step 818, meaning the current interval follows an interval in which it was already determined that the controlled variable was at its upper constraint. If so, an Off_Count value is set to an Off_Delay value at step 820. Otherwise, a determination is made whether the active limit of the controlled variable is set to "Lo" at step 822. If so, this indicates that the controlled variable has switched from being against its lower constraint to being against its upper constraint, and the process skips to step 844. If not, a determination is made whether an On_Count value has reached or exceeded a Delay_On value at step 824, which indicates whether an adequate number of consecutive intervals has been detected with the controlled variable against its upper constraint. If not, the process skips to step 842 to increment the On_Count value. Otherwise, the start of an episode has been detected, and various values for the episode are identified at step 826. This could include, for example, the processor 202 of the device 200 setting the Active_Lim value to "Hi" and setting the Off_Count value to the Off_Delay value. This could also include the processor 202 of the device 200 identifying the start of the current episode as the value of the current interval minus the Delay_On value and setting a "sign" of the current episode to "Hi" (indicating that an upper constraint has been reached).

If the constraint type is not greater than zero at step 814, a determination is made whether the constraint type is less than zero at step 828 (indicating that the relevant constraint is a lower constraint). If not, this indicates that the controlled variable is unconstrained, and the process skips to step 844. If so, the CountLo value is incremented at step 830. A determination is made whether the active limit of the controlled variable is set to "Lo" at step 832, meaning the current interval follows an interval in which it was already determined that the controlled variable was at its lower constraint. If so, the Off_Count value is set to the Off_Delay value at step 834. Otherwise, a determination is made whether the active limit of the controlled variable is set to "Hi" at step 836. If so, this indicates that the controlled variable has switched from being against its upper constraint to being against its lower constraint, and the process skips to step 844. If not, a determination is made whether the On_Count value has reached or exceeded the Delay_On value at step 838, which indicates whether an adequate number of consecutive intervals has been detected with the controlled variable against its lower constraint. If not, the process skips to set 842 to increment the On_Count value. Otherwise, the start of an episode has been detected, and various values for the episode are identified at step 840. This could include, for example, the processor 202 of the device 200 setting the Active_Lim value to "Lo" and setting the Off_Count value to the Off_Delay value. This could also include the processor 202 of the device 200 identifying the start of the current episode as the value of the current interval minus the Delay_On value and setting a "sign" of the current episode to "Lo" (indicating that a lower constraint has been reached).

Step 844 can be reached via any of the determinations at steps 822, 828, and 836. At step 844, a determination is made whether the Active_Lim value is set to "none". If so, the On_Count value is reset to zero at step 852. Otherwise, a determination is made whether the Off_Count value is less than or equal to zero at step 846. If not, the Off_Count value is decremented at step 848. Otherwise, the end of a previously-identified episode has been detected, and various values for the episode are identified at step 850. This could include, for example, the processor 202 of the device 200 resetting the Active_Lim value to none and resetting the On_Count value to zero. This could also include the processor 202 of the device 200 identifying the end of the current episode as the value of the current interval minus the Delay_Off value and incrementing the episode number.

Step 854 can be reached via any of steps 820, 826, 834, 840, 842, 848, and 850. At step 854, a determination is made whether the status during the current interval is valid. If so, values are updated for the current interval at step 856. This could include, for example, the processor 202 of the device 200 incrementing the Count value, adding the predicted value of the controlled variable to the current SumRV value, and adding the squared predicted value of the controlled variable to the current SumRVSqd value. The Interval value is incremented at step 858.

A determination is made whether the current interval is the last interval of the analysis period at step 860. If not, the process returns to step 808 to collect information about the next interval. Otherwise, a determination is made whether the Active_Lim value is true ("Hi" or "Lo") at step 862, which would indicate that the analysis period ended with the controlled variable against its upper or lower constraint. If not, the total number of episodes detected (denoted NumEpisodes) is set equal to EpisodeNum minus one at step 864. Otherwise, various values for the current episode are determined at step 866. This could include, for example, the processor 202 of the device 200 setting the end of the current episode to the current interval and setting the total number of episodes detected to EpisodeNum.

A standard deviation for the controlled variable during all intervals with valid data is determined at step 868. This could include, for example, the processor 202 of the device 200 calculating the standard deviation using the SumRV, SumRVSqd, and Count values. The final results of the method 800 include a set of constraint-limited controlled variable episodes and the controlled variable's standard deviation during those episodes.

FIGS. 9A through 9C illustrate an example method 900 for determining a process variable's control giveaway and standard deviation during limiting episodes according to this disclosure. The method 900 could, for example, be performed during step 610 in the method of FIG. 6. For ease of explanation, the method 900 is described as being performed by the device 200 of FIG. 2 implementing an operator console 110, server 116, or device used in the computing cloud 118 of FIG. 1. However, the method 900 could be used with any suitable device and in any suitable system.

To summarize the method 900, the process iterates through the episodes identified above where a controlled variable is constrained at its upper or lower limit. For each episode, the process selects a time window in which to analyze a model-based controller's behavior. The window could start at a configurable multiple of the controller's closed-loop response time after the beginning of an episode, and the window could end upon completion of the episode. This compensates for the controller's transition time so that the controlled variable's value can move towards a steady-state target. If the time window has some controlled variable samples, the process iterates through the data and calculates the standard deviation of the controlled variable's predicted value (when the measurements are valid) and the average distance between the controlled variable's actual value and its steady-state value (referred to as the controlled variable's "slack"). If there are any valid episodes, the standard deviation factor Z for Equation (1) above can be estimated, such as by using Equation (3) as follows:

$$Z = \frac{AverageSlack}{\sigma_{predVal}} \tag{3}$$

A historical estimate of the Z value for both high and low limits can be calculated, such as by using an exponentially-weighted filtered average of past Z estimates. Equation (1) can then be used to estimate the controlled variable's giveaway based on the standard deviation of the controlled variable's predicted value and the historical estimate of the Z factor. Note that the value of a controlled variable (the predicted value) used within a controller is the summation of a number of independent variable changes, as well as a bias correction based on the measured process value.

As shown in FIGS. 9A through 9C, configuration data for a controlled variable is obtained at step 902. This could include, for example, the processor 202 of the device 200 obtaining the closed-loop response time of a selected controlled variable. This data could be obtained from any suitable source(s), such as directly from the model-based controller 106 or indirectly, such as via a historian 114, server 116, or gateway 120. An episode number (denoted EpNum) is initialized to zero at step 904, which results in the selection of the first episode identified earlier.

Various values are determined to define a time window for the current episode at step 906. This could include, for example, the processor 202 of the device 200 defining the start of the time window (denoted StartInt) as the start of the episode identified above plus some multiple (K1) of the controller's closed-loop response time. The K1 multiplier could be user-defined or set in any other suitable manner.

This could also include the processor 202 of the device 200 defining the end of the time window (denoted EndInt) as the end of the episode identified above.

A determination is made whether the identified end of the time window occurs before the identified start of the time window at step 908, which if true would be indicative of a time window that is too short. If that condition is met, the process skips to step 954. Otherwise, various values are determined to begin the analysis at step 910. This could include, for example, the processor 202 of the device 200 setting an Interval value to the StartInt value, which causes the first interval within the time window to be at the beginning of the time window. This could also include the processor 202 of the device 200 initializing SumGiveAway, SumPV, SumPVSqd, Count, CountOutSL, and CountAdaptSL values to zero.

Controlled variable data for the current interval (as defined by the Interval value) is obtained at step 912. This could include, for example, the processor 202 of the device 200 obtaining the controlled variable's status, steady-state value, predicted value, actual value, constraint type, high limit, low limit, delta high soft limit, delta low soft limit, and adaptive soft limits. This data could be obtained from any suitable source(s), such as directly from the model-based controller 106 or indirectly, such as via a historian 114, server 116, or gateway 120. At least some of this data could also be obtained using the digital twin of the controller's optimizer.

A determination is made whether data for the current interval is valid at step 914. If not, the process skips to step 934. Otherwise, a determination is made whether the current interval is associated with an upper or lower constraint at step 916. If the constraint is an upper constraint at step 916, various values are calculated at step 918. This could include, for example, the processor 202 of the device 200 setting a DeltaSoftLimit value to the DeltaHighSoftLimit value and calculating a Limit value as the HighLimit value minus the DeltaSoftLimit value. A determination is made whether the high soft limit is adaptive at step 920, which would indicate that the high soft limit value could vary over time. If so, the CountAdaptSL value is incremented at step 926. If the constraint is a lower constraint at step 916, various values are calculated at step 922. This could include, for example, the processor 202 of the device 200 setting a DeltaSoftLimit value to the DeltaLowSoftLimit value and calculating a Limit value as the LowLimit value plus the DeltaSoftLimit value. A determination is made whether the low soft limit is adaptive at step 924, which would indicate that the low soft limit value could vary over time. If so, the CountAdaptSL value is incremented at step 926.

At step 928, various additional values are calculated. This could include, for example, the processor 202 of the device 200 incrementing the Count value and setting a GiveAway value to the absolute value of the difference between the controlled variable's actual value and its constraint or limit. This could also include the processor 202 of the device 200 adding the GiveAway value to the SumGiveAway value and adding the controlled variable's predicted value to the SumPV value. This could further include the processor 202 of the device 200 adding the squared predicted value of the controlled variable to the SumPVSqd value. A determination is made whether the GiveAway value meets or exceeds the DeltaSoftLimit value at step 930. If so, the CountOutSL value is incremented at step 932. The Interval value is incremented at step 934, and a determination is made whether the last interval in the time window has been processed at step 936. If not, the process returns to step 912 to obtain and analyze data for the next interval in the time window.

Otherwise, a determination is made whether the Count value exceeds a minimum value (denoted MinN) at step 938. If not, the current episode is discarded, and the process skips to step 954. Otherwise, various statistics are calculated for the current episode at step 940. This could include, for example, the processor 202 of the device 200 calculating the standard deviation for the controlled variable's value during the current episode and the average control giveaway for the controlled variable's value during the current episode. This could also include the processor 202 of the device 200 calculating the percentage of time that the controlled variable operated with an adaptive limit and the percentage of time that the controlled variable operated with a soft limit being violated.

A determination is made whether either of the percentages calculated in the prior step exceeds some threshold A or B at step 942. If so, the standard deviation factor Z for the episode is calculated as the average giveaway during that episode divided by the controlled variable's standard deviation during that episode at step 944. If not, the standard deviation factor Z for the episode is calculated as the delta soft limit during that episode divided by the controlled variable's standard deviation during that episode at step 946. A determination is made whether the current episode is associated with an upper or lower constraint at step 948. If associated with an upper constraint, the standard deviation factor $Z_{HI}$ for the upper constraint during that episode is set equal to Z at step 950. Otherwise, the standard deviation factor $Z_{LO}$ for the lower constraint during that episode is set equal to Z at step 952.

The episode number is incremented at step 954, and a determination is made whether there are additional episodes to process at step 956. If so, the process returns to step 906 to collect and analyze information associated with the next episode. Otherwise, the process ends. The final results of the method 900 include the estimated Z value for each episode.

FIG. 10 illustrates an example method 1000 for identifying causes of a process variable's variance according to this disclosure. The method 1000 could, for example, be performed during step 614 in the method of FIG. 6. For ease of explanation, the method 1000 is described as being performed by the device 200 of FIG. 2 implementing an operator console 110, server 116, or device used in the computing cloud 118 of FIG. 1. However, the method 1000 could be used with any suitable device and in any suitable system.

To summarize the method 1000, contributory causes to variance and/or control giveaway in a controlled variable are identified. The standard deviation of each of these contributory causes can be estimated over the selected timeframe in FIG. 10 and used as the contribution of that cause to the controlled variable's variance and/or control giveaway.

As shown in FIG. 10, start and end intervals of an analysis period are selected at step 1002. This could include, for example, the processor 202 of the device 200 identifying the sampling or control interval that occurs at the beginning of the analysis period previously identified in step 602 and the sampling or control interval that occurs at the end of the analysis period previously identified in step 602. Note, however, that the same intervals identified in step 702 could be used here.

Various values are initialized at step 1004. This could include, for example, the processor 202 of the device 200 initializing an Interval value, which is used to represent the specific sampling or control interval being examined. This could also include the processor 202 of the device 200 initializing SumΔIV and SumΔIVSqd array values and a Count value to zero.

Controlled variable data for the current interval (as defined by the Interval value) is obtained at step 1006. This could include, for example, the processor 202 of the device 200 obtaining a bias move and independent variable (manipulated variable) moves associated with the controlled variable. This data could be obtained from any suitable source(s), such as directly from the model-based controller 106 or indirectly, such as via a historian 114, server 116, or gateway 120.

An independent variable that impacts the controlled variable is selected at step 1008, and various values are calculated for that independent variable at step 1010. This could include, for example, the processor 202 of the device 200 adding the moves for the $i^{th}$ independent variable to the SumΔIV value for the $i^{th}$ independent variable. This could also include the processor 202 of the device 200 adding the squared moves for the $i^{th}$ independent variable to the SumΔIVSqd value for the $i^{th}$ independent variable. The next independent variable is selected at step 1012, and steps 1008-1012 repeat until all independent variables that impact the controlled variable have been processed. Various additional values are then calculated at step 1014. This could include, for example, the processor 202 of the device 200 adding the bias move for the current interval to the SumBias value and adding the squared bias move for the current interval to the SumBiasSqd value. The Interval value is incremented at step 1016, and a determination is made whether the last interval in the analysis period has been processed at step 1018. If not, the process returns to step 1006 to process the next interval's data.

An independent variable that impacts the controlled variable and the associated bias are selected at step 1020, and a standard deviation of that independent variable is determined at step 1022. The standard deviation of the independent variable functions as a measure of that independent variable's contribution to the variance or control giveaway for the controlled variable. The next independent variable is selected at step 1024, and steps 1020-1024 repeat until all independent variables have been processed. The final results from the method 1000 can include a collection of standard deviations representing how multiple independent variables contribute to the variance or control giveaway for the controlled variable.

Although FIGS. 7A through 10 illustrate example methods for performing operations in the method 600 of FIG. 6, various changes may be made to FIGS. 7A through 10. For example, while shown as a series of steps, various steps in each figure could overlap, occur in parallel, occur in a different order, or occur any number of times. Also, while specific variables and operations have been described here, these relate to specific implementations of the operations in the method 600 of FIG. 6. Those operations in FIG. 6 could be performed in any other suitable manner.

Figure 11:
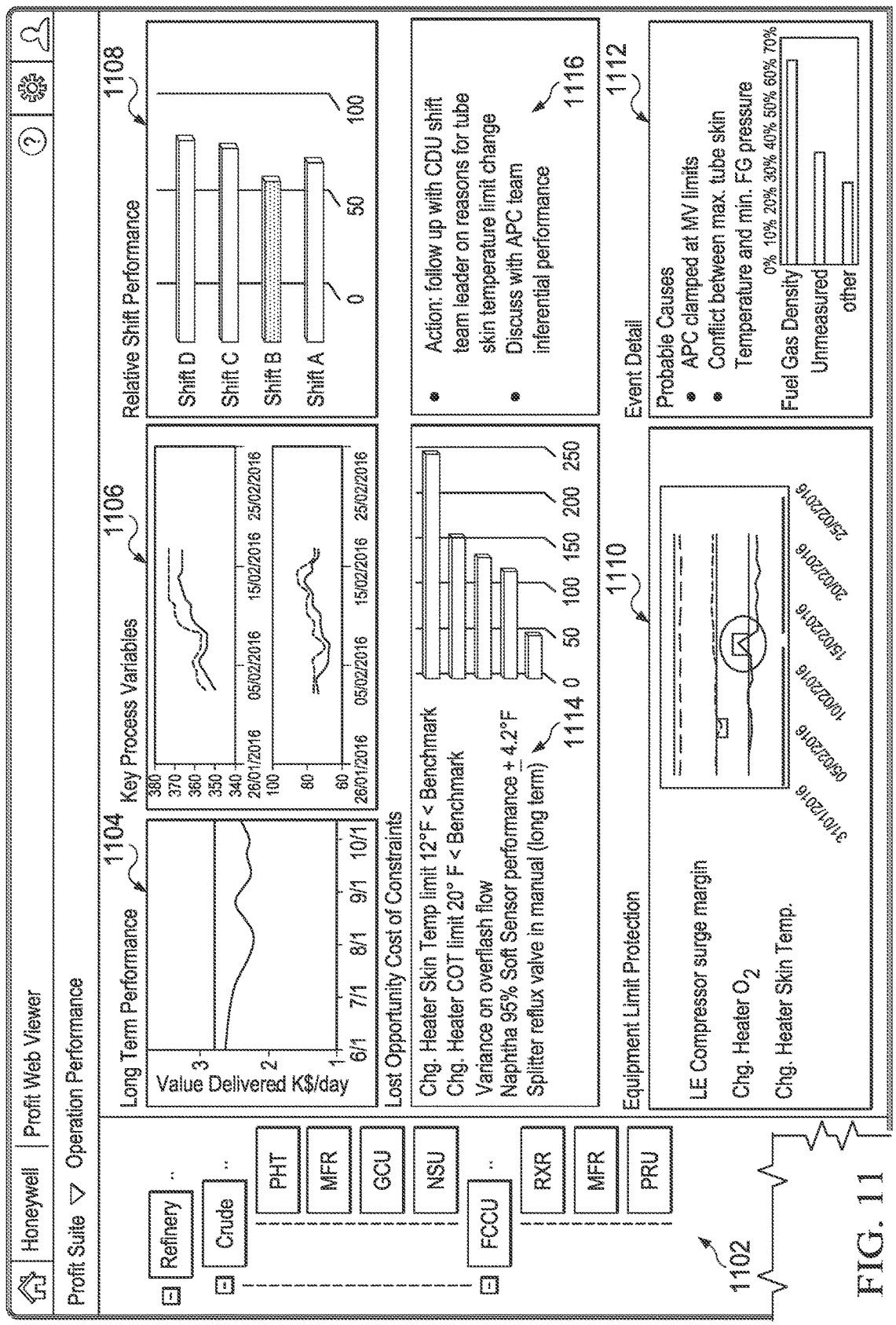
FIG. 11 illustrates an example graphical user interface for identifying impacts and causes of variability or control giveaway on model-based controller performance according to this disclosure.

FIG. 11 illustrates an example graphical user interface 1100 for identifying impacts and causes of variability or control giveaway on model-based controller performance according to this disclosure. The graphical user interface 1100 could, for example, be generated and presented to at least one user during step 520 in FIG. 5 or during step 618 in FIG. 6. For ease of explanation, the graphical user interface 1100 is described as being generated by the device 200 of FIG. 2 implementing an operator console 110, server 116, or device used in the computing cloud 118 of FIG. 1. However, the graphical user interface 1100 could be generated by any suitable device and in any suitable system.

As shown in FIG. 11, the graphical user interface 1100 includes a tree 1102 that identifies various equipment in or associated with an industrial process. The tree 1102 can be navigated by a user to select particular equipment. For the selected equipment, the graphical user interface 1100 includes a section 1104 identifying the long-term performance of the equipment, a section 1106 identifying key process variables for the equipment, and a section 1108 identifying how the equipment operates during different work shifts (which are associated with different human operators). The graphical user interface 1100 also includes a section 1110 identifying limit violations for the equipment and a section 1112 identifying details of a selected limit violation. This information could be generated in any suitable manner, such as when the limit violations and the details of a selected limit violation are identified using the techniques disclosed in U.S. patent application Ser. No. 15/972,432, filed May 7, 2018 entitled "APPARATUS AND METHOD FOR AUTOMATED IDENTIFICATION AND DIAGNOSIS OF CONSTRAINT VIOLATIONS".

The graphical user interface 1100 further includes a section 1114 that identifies how process variability or control giveaway affects the performance of at least one model-based controller associated with the selected equipment. In particular, the section 1114 here identifies different contributory causes and how each of those causes contributes to lost opportunity costs (expressed in terms of a percentage). The lost opportunity costs are based on the process variability or control giveaway and identify improvements that could be made to the operation of a model-based controller 106. These percentages identify how the different contributory causes can prevent the controller 106 from operating at one or more of its controlled variable constraints. The contributory causes and the percentages could be those identified in the method 1000 as described above. A section 1116 identifies one or more possible corrective courses of action that could be taken to reduce or resolve one or more of the lost opportunity costs identified in the section 1114. The possible corrective courses of action could be identified in any suitable manner, such as based on information in a knowledge repository.

Figure 12:
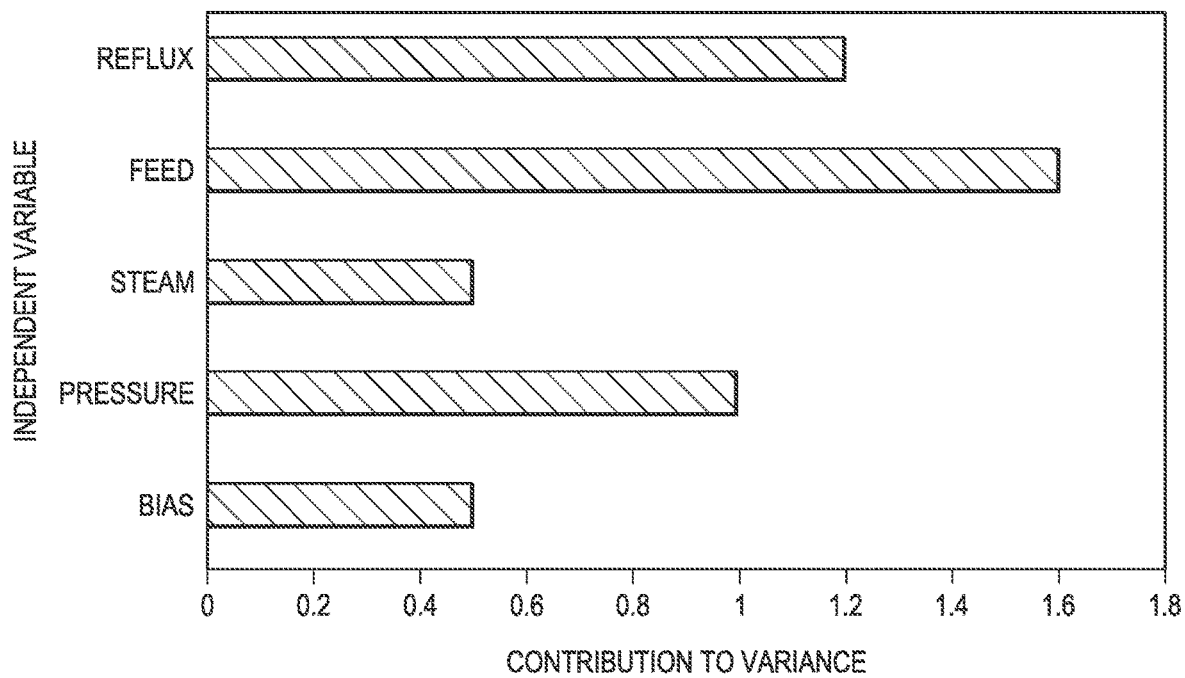
FIGS. 12 and 13 illustrate example drill-down displays in a graphical user interface for identifying impacts and causes of variability or control giveaway on model-based controller performance according to this disclosure.
Figure 13:
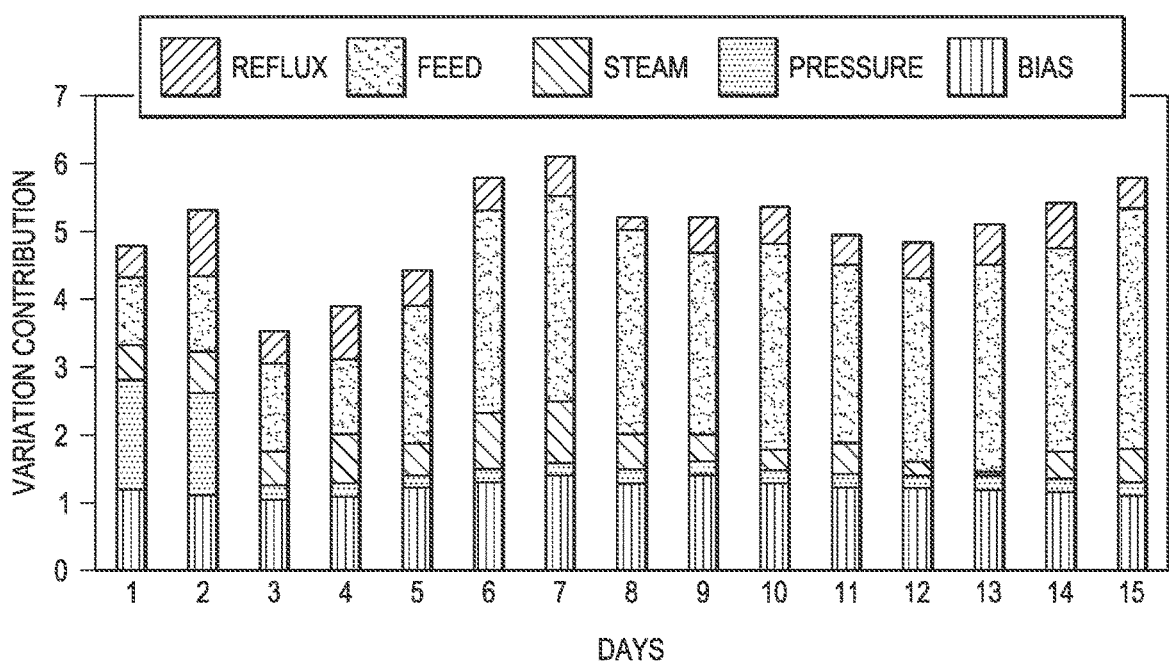

A user could select one of the contributory causes identified in the section 1114 to view additional information about that specific cause. For example, FIGS. 12 and 13 illustrate example drill-down displays 1200 and 1300 in a graphical user interface for identifying impacts and causes of variability or control giveaway on model-based controller performance according to this disclosure. In FIG. 12, the display 1200 identifies multiple independent variables and how each of those independent variables contributes to process variability or control giveaway overall during a current reporting period (such as a single day). In FIG. 13, the display 1300 identifies multiple independent variables and how each of those independent variables specifically contributes to process variability or control giveaway during multiple reporting periods (such as multiple days). These metrics also provide a basis for further heuristic-based analysis, such as to improve the tuning of the controller 106 and to trigger an exploratory workflow to determine root causes of measured and unmeasured disturbances.

Although FIG. 11 illustrates one example of a graphical user interface 1100 for identifying impacts and causes of variability or control giveaway on model-based controller performance, various changes may be made to FIG. 11. For example, the content and layout of the graphical user interface 1100 could vary as needed or desired. As a particular example, the graphical user interface 1100 could vary based on the user role of the user who is to view the graphical user interface 1100. Although FIGS. 12 and 13 illustrate examples of drill-down displays 1200 and 1300 in a graphical user interface for identifying impacts and causes of variability or control giveaway on model-based controller performance, various changes may be made to FIGS. 12 and 13. For instance, any other suitable drill-down displays could be generated to identify impacts and causes of variability or control giveaway on model-based controller performance.

Note that the techniques for identifying impacts and causes of variability or control giveaway on model-based controller performance described above could be used or operate in conjunction with any combination or all of various features described in the provisional patent applications incorporated by reference above and/or in the following concurrently-filed patent applications (all of which are hereby incorporated by reference):

U.S. Patent Application No. 62/518,352 entitled "APPARATUS AND METHOD FOR AUTOMATED IDENTIFICATION AND DIAGNOSIS OF CONSTRAINT VIOLATIONS";

U.S. Patent Application No. 62/518,474 entitled "APPARATUS AND METHOD FOR ESTIMATING IMPACTS OF OPERATIONAL PROBLEMS IN ADVANCED CONTROL OPERATIONS FOR INDUSTRIAL CONTROL SYSTEMS"; and U.S. Patent Application No. 62/518,478 entitled "APPARATUS AND METHOD FOR IDENTIFYING, VISUALIZING, AND TRIGGERING WORKFLOWS FROM AUTO-SUGGESTED ACTIONS TO RECLAIM LOST BENEFITS OF MODEL-BASED INDUSTRIAL PROCESS CONTROLLERS".

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An automated method comprising:
   obtaining data identifying values of one or more controlled variables associated with an industrial process controller configured to operate the one or more control variables at respectively associated limits;
   identifying periods when at least one of the one or more controlled variables has been moved to an associated limit by the controller;
   for each identified period, (i) identifying a standard deviation of predicted values over the identified period for the associated controlled variable and (ii) determining a control giveaway value for the associated controlled variable over the identified period based on the identified standard deviation of predicted values, the control giveaway value is indicative of an offset between the associated controlled variable's average value and the associated limit;
   identifying variances in the one or more controlled variables using the control giveaway values; and
   generating a graphical display identifying one or more impacts or causes for at least some of the variances.

2. The method of claim 1, further comprising:
   validating the obtained data prior to identifying the periods;
   wherein validating the obtained data comprises removing a portion of the data deemed invalid.

3. The method of claim 2, wherein validating the obtained data comprises using predictions generated by an optimizer associated with the controller to identify valid or invalid data.

4. The method of claim 1, wherein identifying the periods comprises:
   identifying a start of a period as a first time or interval when a value of a controlled variable is at the associated limit; and
   identifying an end of the period as a first time or interval when the value of the controlled variable is not at the associated limit.

5. The method of claim 1, further comprising:
   determining the one or more impacts or causes for the at least some of the variances.

6. The method of claim 5, wherein the one or more impacts or causes are determined based on a comparison of the control giveaway values to a benchmark control giveaway value.

7. The method of claim 5, wherein determining the one or more impacts or causes comprises:
   identifying multiple independent variables associated with each of the one or more controlled variables; and
   identifying a standard deviation of each of the independent variables, each standard deviation representing a measure of the independent variable's contribution to the variance of the associated controlled variable.

8. An apparatus comprising:
at least one interface configured to receive data identifying values of one or more controlled variables associated with an industrial process controller; and
at least one processor configured to:
identify periods when at least one of the one or more controlled variables has been moved to an associated limit by the controller;
for each identified period, (i) identify a standard deviation of predicted values over the identified period for the associated controlled variable and (ii) determine a control giveaway value for the associated controlled variable over the identified period based on the standard deviation of predicted values, the control giveaway value is indicative of an offset between the associated controlled variable's average value and the associated limit;
identify variances in the one or more controlled variables using the control giveaway values; and
generate a graphical display identifying one or more impacts or causes for at least some of the variances.

9. The apparatus of claim 8, wherein:
the at least one processor is configured to validate the data prior to identifying the periods; and
to validate the data, the at least one processor is configured to remove a portion of the data deemed invalid.

10. The apparatus of claim 9, wherein, to validate the data, the at least one processor is configured to use predictions generated by an optimizer associated with the controller to identify valid or invalid data.

11. The apparatus of claim 8, wherein, to identify the periods, the at least one processor is configured to:
identify a start of a period as a first time or interval when a value of a controlled variable is at the associated limit; and
identify an end of the period as a first time or interval when the value of the controlled variable is not at the associated limit.

12. The apparatus of claim 8, wherein the at least one processor is further configured to determine the one or more impacts or causes for the at least some of the variances.

13. The apparatus of claim 12, wherein, to determine the one or more impacts or causes, the at least one processor is configured to compare the control giveaway values to a benchmark control giveaway value.

14. The apparatus of claim 12, wherein, to determine the one or more impacts or causes, the at least one processor is configured to:
identify multiple independent variables associated with each of the one or more controlled variables; and
identify a standard deviation of each of the independent variables, each standard deviation representing a measure of the independent variable's contribution to the variance of the associated controlled variable.

15. A non-transitory computer readable medium containing instructions that when executed cause at least one processing device to:
obtain data identifying values of one or more controlled variables associated with an industrial process controller configured to operate the one or more control variables at respectively associated limits;
identify periods when at least one of the one or more controlled variables has been moved to an associated limit by the controller;
for each identified period, (i) identify a standard deviation of predicted values over the identified period for the associated controlled variable and (ii) determine a control giveaway value for the associated controlled variable over the identified period based on the standard deviation of predicted values, the control giveaway value is indicative of an offset between the associated controlled variable's average value and the associated limit;
identify variances in the one or more controlled variables using the control giveaway values; and
generate a graphical display identifying one or more impacts or causes for at least some of the variances.

16. The non-transitory computer readable medium of claim 15, further containing instructions that when executed cause the at least one processing device to validate the obtained data prior to identifying the periods and remove a portion of the data deemed invalid.

17. The non-transitory computer readable medium of claim 15, wherein the instructions that when executed cause the at least one processing device to identify the periods comprise:
instructions that when executed cause the at least one processing device to:
identify a start of a period as a first time or interval when a value of a controlled variable is at the associated limit; and
identify an end of the period as a first time or interval when the value of the controlled variable is not at the associated limit.

18. The non-transitory computer readable medium of claim 15, further containing instructions that when executed cause the at least one processing device to determine the one or more impacts or causes for the at least some of the variances.

19. The non-transitory computer readable medium of claim 18, wherein the instructions that when executed cause the at least one processing device to determine the one or more impacts or causes comprise:
instructions that when executed cause the at least one processing device to determine the one or more impacts or causes based on a comparison of the control giveaway values to a benchmark control giveaway value.

20. The non-transitory computer readable medium of claim 18, wherein the instructions that when executed cause the at least one processing device to determine the one or more impacts or causes comprise:
instructions that when executed cause the at least one processing device to:
identify multiple independent variables associated with each of the one or more controlled variables; and
identify a standard deviation of each of the independent variables, each standard deviation representing a measure of the independent variable's contribution to the variance of the associated controlled variable.

* * * * *